(12) United States Patent
Iizuka et al.

(10) Patent No.: US 6,937,374 B2
(45) Date of Patent: *Aug. 30, 2005

(54) SCANNING OPTICAL SYSTEM

(75) Inventors: Takashi Iizuka, Saitama-ken (JP);
Daisuke Koreeda, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/792,737

(22) Filed: Mar. 5, 2004

(65) Prior Publication Data

US 2004/0174581 A1 Sep. 9, 2004

Related U.S. Application Data

(63) Continuation of application No. 10/173,613, filed on Jun. 19, 2002, now Pat. No. 6,771,406.

(30) Foreign Application Priority Data

Jun. 20, 2001 (JP) ........................................ 2001-186888

(51) Int. Cl.$^7$ .............................................. G02B 26/08
(52) U.S. Cl. ........................ 359/205; 359/207; 359/216
(58) Field of Search ................................ 359/204–207, 359/216–219; 347/233, 243, 244

(56) References Cited

U.S. PATENT DOCUMENTS

| | | | |
|---|---|---|---|
| 5,251,055 A | * 10/1993 | Koide | .......................... 359/216 |
| 6,046,835 A | 4/2000 | Yamawaki et al. | |
| 6,052,211 A | 4/2000 | Nakajima | |
| 6,317,245 B1 | 11/2001 | Hama et al. | |
| 6,392,772 B1 | * 5/2002 | Hama et al. | ................. 359/204 |
| 6,392,773 B1 | 5/2002 | Hama et al. | |
| 6,636,340 B1 | 10/2003 | Hama et al. | |
| 6,771,406 B2 | * 8/2004 | Iizuka et al. | ................. 359/204 |

FOREIGN PATENT DOCUMENTS

JP  11-64754  3/1999

* cited by examiner

*Primary Examiner*—James Phan
(74) *Attorney, Agent, or Firm*—Greenblum & Bernstein, P.L.C.

(57) ABSTRACT

A scanning optical system includes a polygonal mirror that deflects the even number of beams, which are incident thereon along optical paths arranged symmetrically with respect to a plane perpendicular to a rotation axis thereof. An imaging optical system for converging the beams includes lenses for converging the beam, in an auxiliary scanning direction, respectively. The lenses have the same shapes, and are arranged symmetrically with respect to the plane. The orientation of the lenses on one side of the plane is oriented oppositely, in the auxiliary scanning direction, to the other lenses located on the other side of the plane.

16 Claims, 16 Drawing Sheets

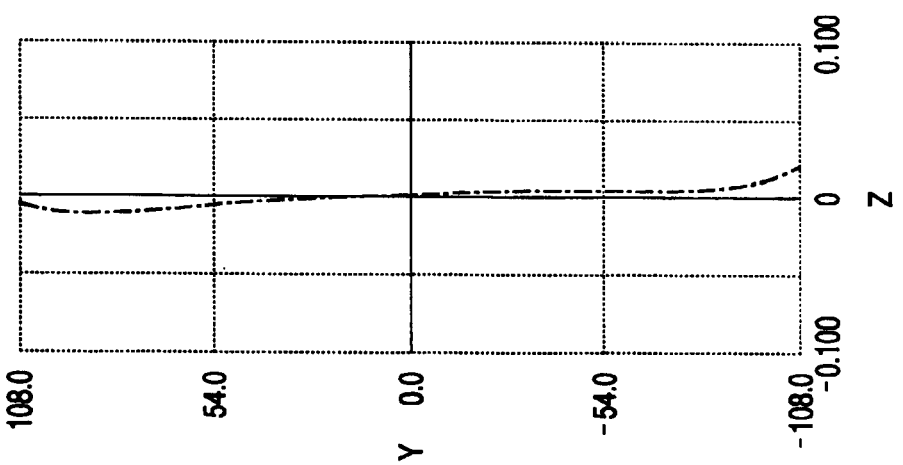
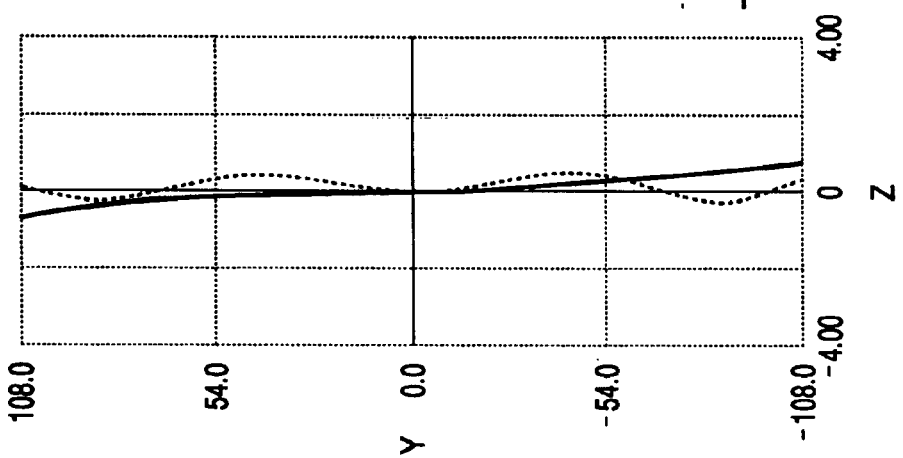
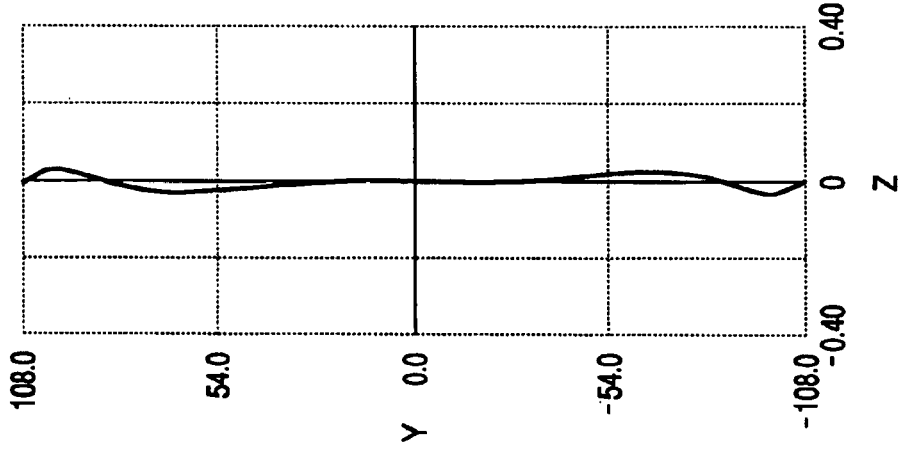

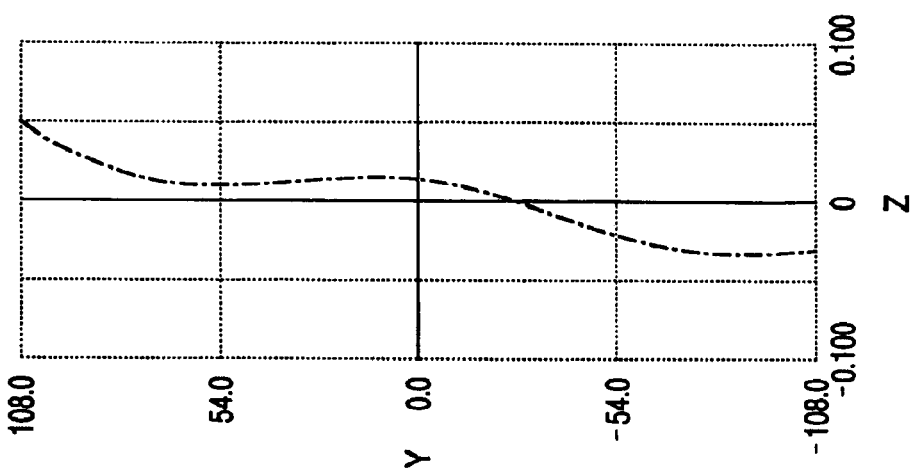
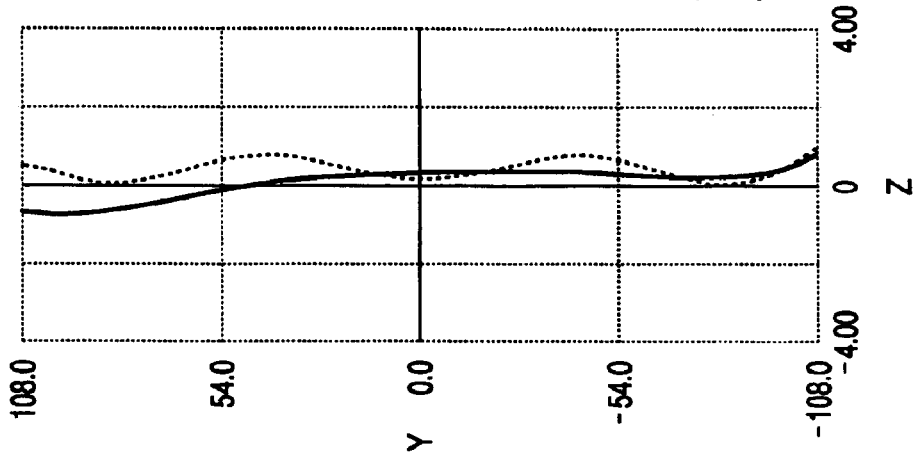
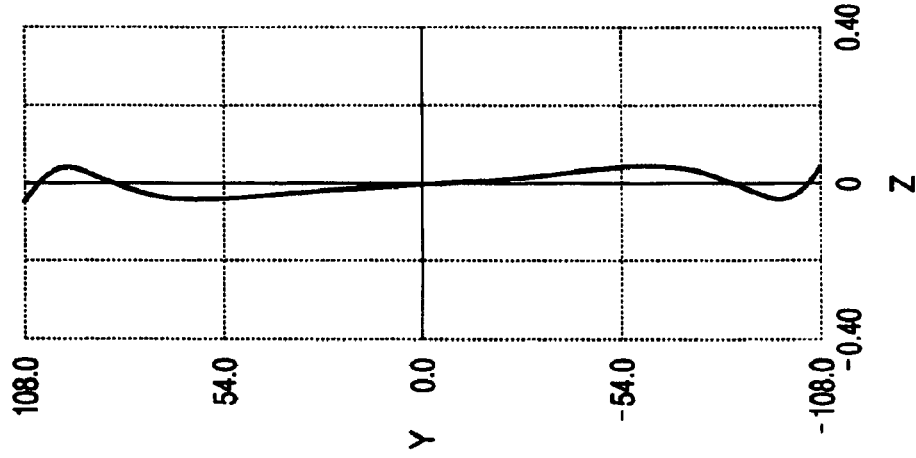

SCANNING OPTICAL SYSTEM

This is a continuation of U.S. application Ser. No. 10/173,613 filed Jun. 19, 2002, U.S. Pat. No. 6,771,406, the contents of which are expressly incorporated by reference herein in its entirety.

BACKGROUND OF THE INVENTION

The present invention relates to a scanning optical system employed, for example, in a color laser beam printer, color laser copier or the like.

Color printers have been developed and widely used for an output device of computers, color copiers or the like. In order to form a color image at a high speed, a color laser printer is widely employed. The color laser beam printer typically includes a plurality of photoconductive drums, and corona chargers, developing units etc. for respective color components, i.e., yellow (Y), magenta (M), cyan (C) and black (B).

In order to form electrostatic latent images consisting of the four color components on the photoconductive drums, respectively, four scanning optical systems, each of which has a polygonal mirror and imaging optical system, may be used. However, such an apparatus provided with four polygonal mirrors and four imaging optical systems for four photoconductive drums costs a lot in manufacturing thereof. Recently, an apparatus making use of a single polygonal mirror for simultaneously deflecting four beams corresponding to the four color components has been developed. The four deflected beams are incident on four imaging optical systems, respectively, thereby the four beams being directed to the four photoconductive drums. Thus, four image components can be formed simultaneously.

In order to simultaneously deflect a plurality of laser beams using a single polygonal mirror, in particular, to make a plurality of beams be incident on the plurality of imaging optical systems arranged separately in the auxiliary scanning direction, respectively, the beams should be inclined at different angles with respect to a plane perpendicular to a rotational axis of the polygonal mirror, or the beams are separated from each other in the auxiliary scanning direction.

If laser beams are inclined with respect to a plane perpendicular to the rotation axis of the polygonal mirror, the scanning lines, which are loci formed by moving beam spots on the surfaces to be scanned, curve in the auxiliary scanning direction (i.e., in a circumferential direction of photoconductive drums). By appropriately arranging a lens, which is one of the lenses of the imaging lens, having a power to converge a beam in the auxiliary scanning direction and located closer to the surface to be scanned than the other lenses, the curvature of the scanning lines in the auxiliary scanning direction, or the bow can be suppressed by a certain degree. However, the above-described lens should be manufactured to have a relatively wide effective area. Further, in view of the aberration compensation, it is preferable that the refraction surfaces have asymmetrical surface. Therefore, manufacturing such a lens is very difficult. Further, four of such lenses should be prepared, which increases the manufacturing cost of the entire scanning optical system.

Further, there is a requirement, among manufacturers, that if a certain accuracy is to be maintained the shape of the lenses should be the same to suppress the manufacturing cost.

SUMMARY OF THE INVENTION

The present invention is advantageous in that, a scanning optical system is provided, in which a plurality of beams incident on a single polygonal mirror are inclined with respect to a plane perpendicular to the rotation axis of the polygonal mirror, and the bow of the scanning lines can be well suppressed using inexpensive lenses.

According to the present invention, there is provided a scanning optical system that emits at least two beams to the same number of surfaces to be scanned, respectively. The scanning optical system includes a polygonal mirror that is rotated about a rotation axis thereof to deflect the at least two beams simultaneously to scan in a main scanning direction, the at least two beams incident on the polygonal mirror along the same number of optical paths, respectively, the same number of optical paths being arranged symmetrically with respect to a plane perpendicular to the rotation axis, and an imaging optical system that converges the at least two beams deflected by the polygonal mirror on the same number of surfaces to be scanned, respectively.

Such an imaging optical system includes at least two lenses, each of the at least two lenses converging an incident beam, in an auxiliary scanning direction which is perpendicular to the main scanning direction, on a corresponding surface to be scanned. The at least two beams deflected by the polygonal mirror pass through the at least two lenses, respectively. The at least two lenses have the same shapes, and the at least two lenses are arranged symmetrically with respect to the plane. An orientation of one of the at least two lenses is oriented oppositely, in the auxiliary scanning direction, to the other one of the at least two lenses.

With the above configuration, the pair of laser beams pass through equivalent portions of two lenses, which are arranged symmetrically with respect to the plane perpendicular to the rotation axis of the polygonal mirror. If the lenses are formed to appropriately compensate for aberrations for one of the pair of beams, since one lens is oriented oppositely to the other lens, aberrations for the other beam can also be compensated.

As above, by arranging a pair of optical paths symmetrically with respect to the plane perpendicular to the rotation axis of the polygonal mirror, the shapes of a pair of lenses corresponding to the pair of beams can be made identical. Accordingly, the same lenses can be used in the scanning optical system, which suppresses the manufacturing cost thereof.

optionally, the two laser beams may intersect, in the auxiliary scanning direction, with each other at a point in the vicinity of a reflection surface of the polygonal mirror.

With this configuration, the thickness of the polygonal mirror, in the auxiliary scanning direction, can be reduced. As a result, the size of the polygonal mirror can be reduced, and therefore, a motor having a smaller power can be employed for driving the polygonal mirror.

Optionally, the at least two laser beams may intersect with each other at a point, within the plane perpendicular to the rotational axis of the polygonal mirror, in the vicinity of a reflection surface of the polygonal mirror.

Further optionally, the imaging optical system may include a lens group located on an upstream side of the pair of lenses, all of the at least two beams passing through the lens group.

In this case, an optical axis of the lens group may be parallel with the plane, the lens group being arranged such that an optical axis of the lens group is parallel with the plane and is located on a second plane passing through a point at which the at least two beams intersect with each other. A shape of the lens group is configured to be symmetrical with respect to a main scanning plane which is a plane including the optical axis of the lens group and perpendicular to the rotational axis of the polygonal mirror.

Still optionally, each of the at least two lenses may be configured to be symmetrical with respect to a plane which includes a reference axis of each of the at least two lenses and parallel with the rotational axis of the polygonal mirror.

In this case, each of the at least two lenses may have an anamorphic aspherical surface expressed with two-dimensional polynomial, inclination of the anamorphic aspherical surface varying in the auxiliary scanning direction.

Optionally, the at least two lenses may be formed using the same molding.

According to another aspect, there is provided a scanning optical system that emits at least two beams to the same number of surfaces to be scanned, respectively, which is provided with a polygonal mirror that is rotated about a rotation axis thereof to deflect the at least two beams simultaneously to scan in a main scanning direction, the at least two beams incident on the polygonal mirror along the same number of optical paths, respectively, the same number of optical paths being arranged symmetrically with respect to a plane perpendicular to the rotation axis, and an imaging optical system that converges the at least two beams deflected by the polygonal mirror on the same number of surfaces to be scanned, respectively.

In such an imaging optical system, further provided is a same number of lenses, each of the same number of lenses converging an incident beam, in an auxiliary scanning direction which is perpendicular to the main scanning direction, on a corresponding surface to be scanned. The at least two beams deflected by the polygonal mirror passing through the same number of lenses, respectively. The same number of lenses have the same shapes, and are arranged symmetrically with respect to the plane. An orientation of one of the lenses receiving a beam proceeding along an optical path arranged on one side of the plane being oriented oppositely, in the auxiliary scanning direction, to another lens receiving a beam proceeding along an optical path arranged on the other side of the plane.

According to further aspect of the invention, there is provided a scanning optical system that emits an even number of beams to the same number of surfaces to be scanned, respectively, which is provided with a polygonal mirror that is rotated about a rotation axis thereof to deflect the even number of beams simultaneously to scan in a main scanning direction, the even number of beams incident on the polygonal mirror along a same number of optical paths, respectively, the same number of optical paths being arranged symmetrically with respect to a plane perpendicular to the rotation axis, and an imaging optical system that converges the even number of beams deflected by the polygonal mirror on the same number of surfaces to be scanned, respectively.

The imaging optical system may include a same number of lenses, each of the same number of lenses converging an incident beam, in an auxiliary scanning direction which is perpendicular to the main scanning direction, on a corresponding surface to be scanned, the even number of beams deflected by the polygonal mirror passing through the same number of lenses, respectively. The same number of lenses have the same shapes, and the same number of lenses being arranged symmetrically with respect to the plane. An orientation of lenses of the same number of lenses receiving beams proceeding along optical paths arranged on one side of the plane are oriented oppositely, in the auxiliary scanning direction, to the other lenses receiving beams proceeding along optical paths arranged on the other side of the plane.

BRIEF DESCRIPTION OF THE ACCOMPANYING DRAWINGS

Figure 3:
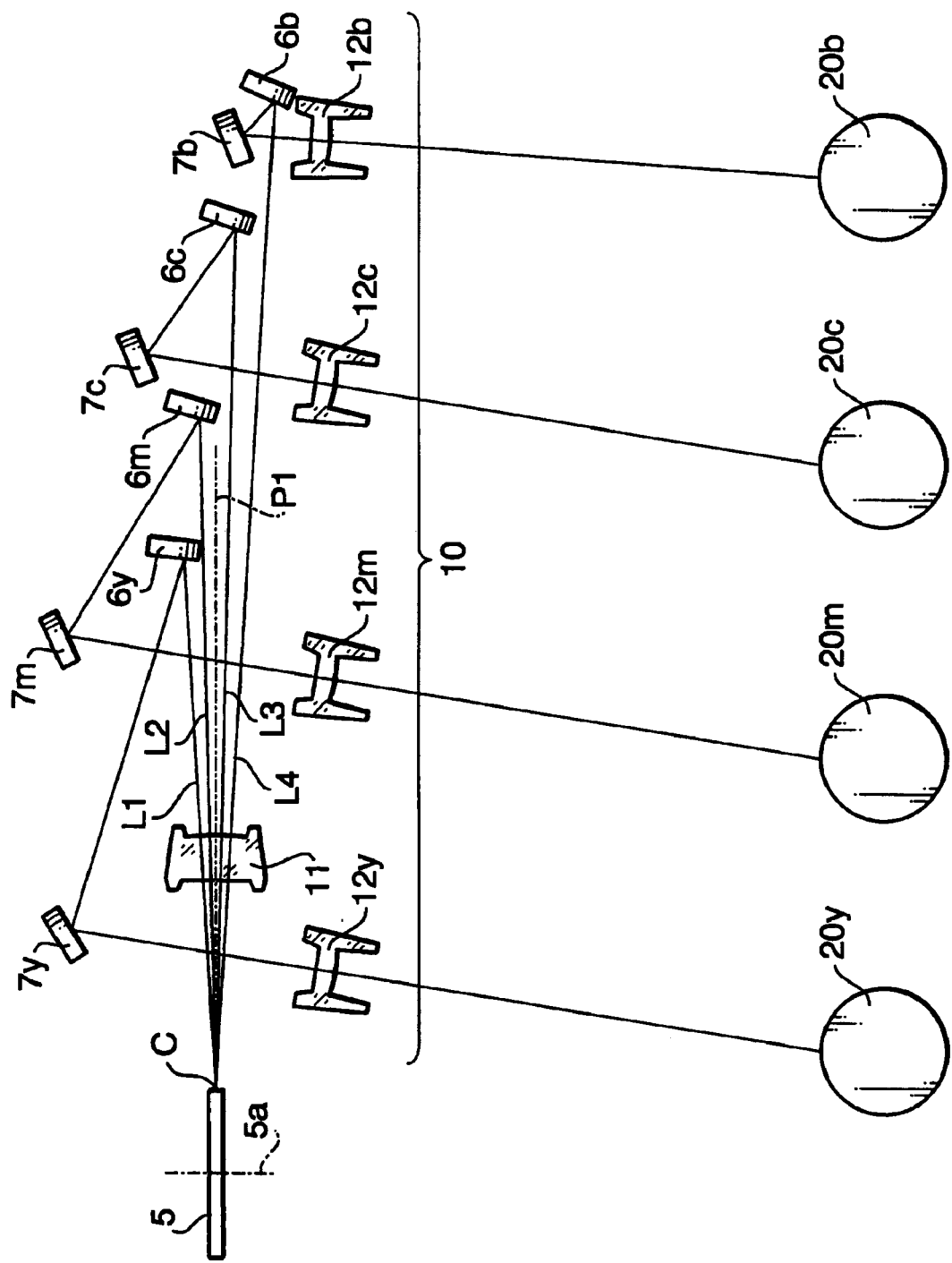
Figure 4:
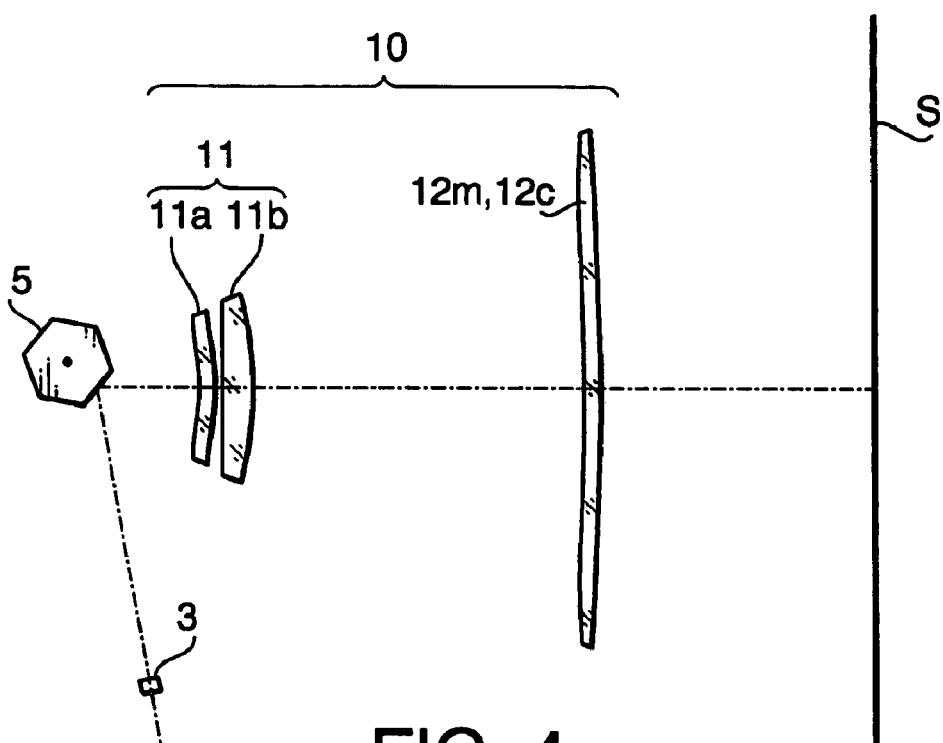
Figure 5:
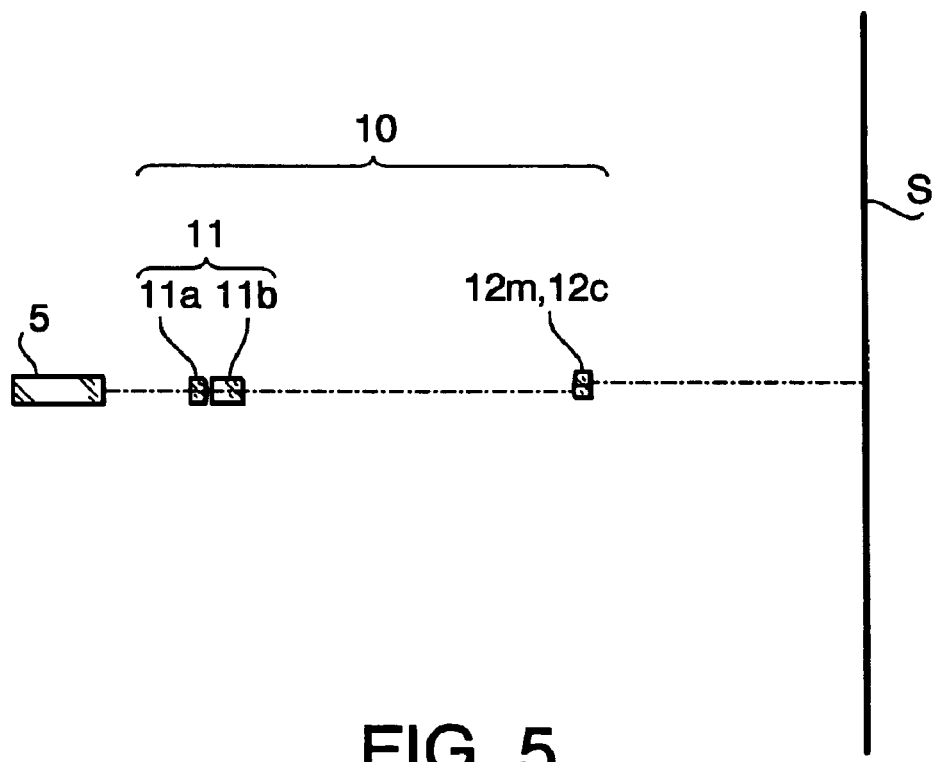
Figure 6:
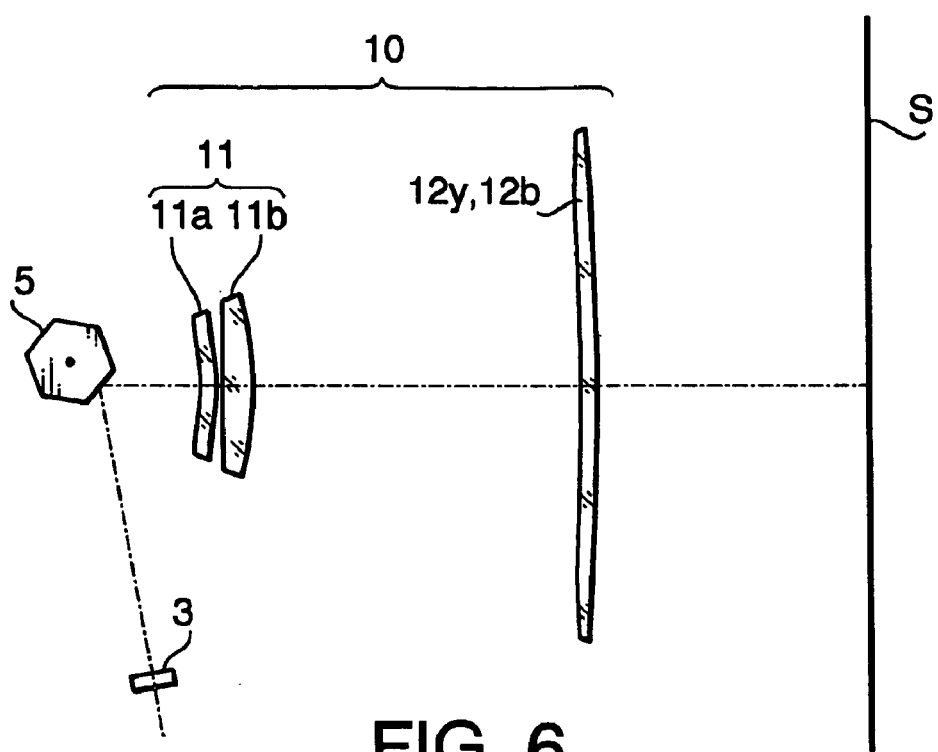
Figure 7:
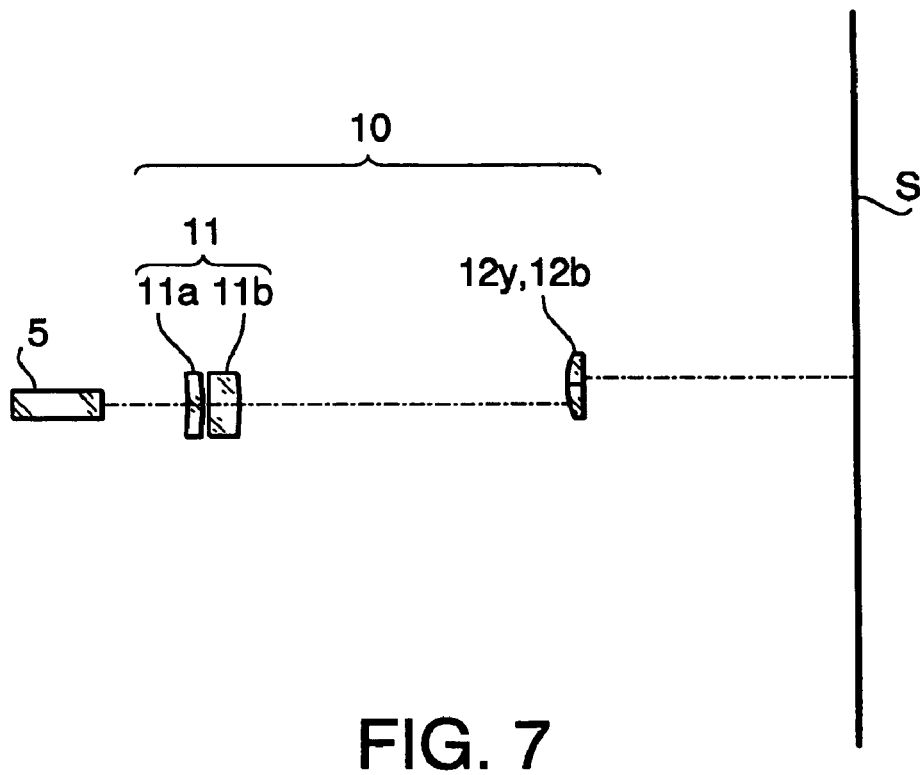
Figure 8:
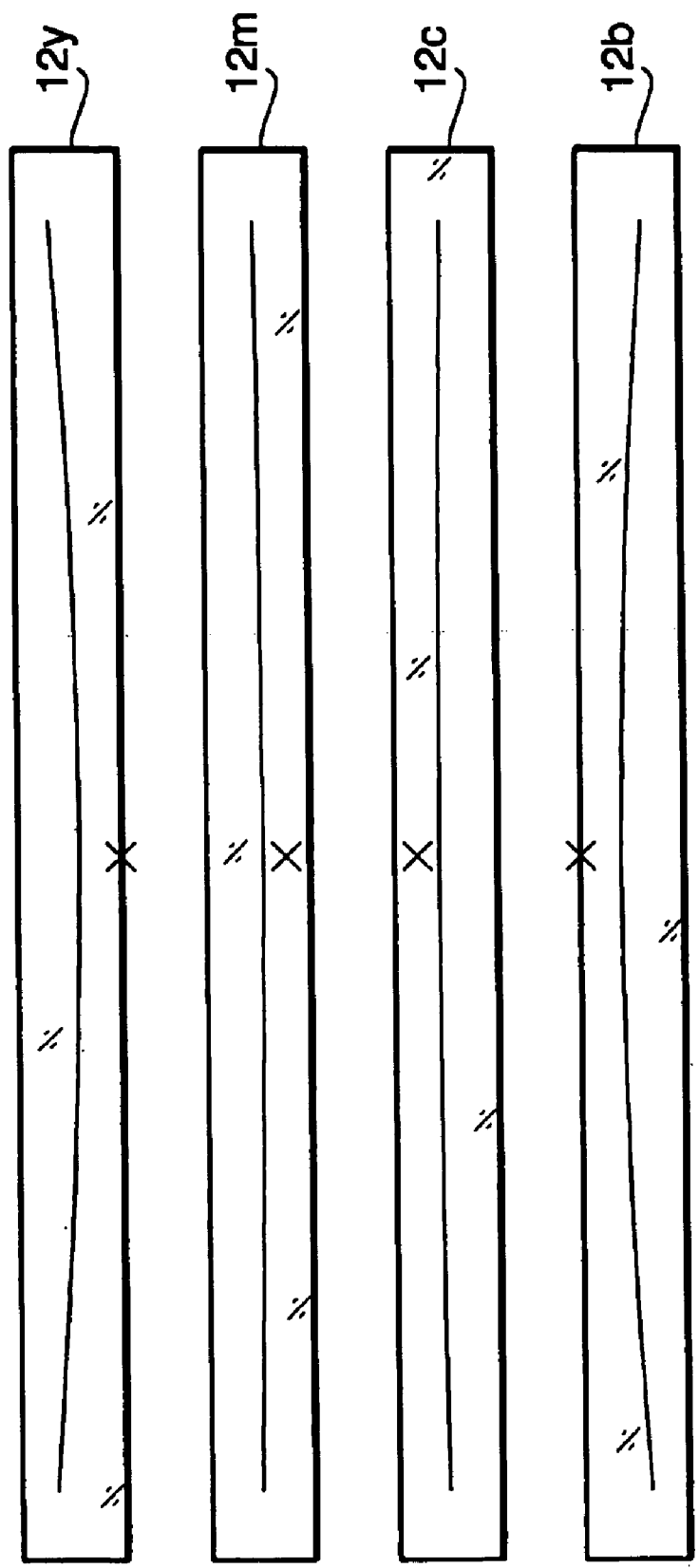
Figure 10A:
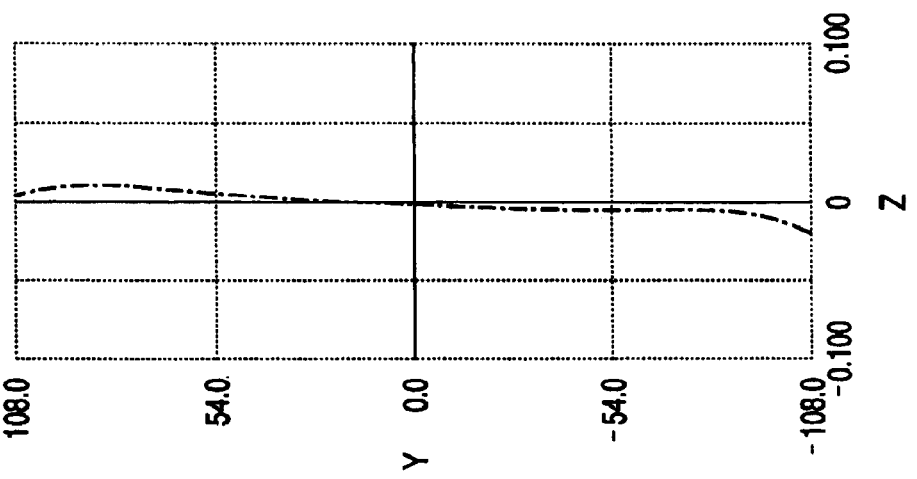
Figure 10B:
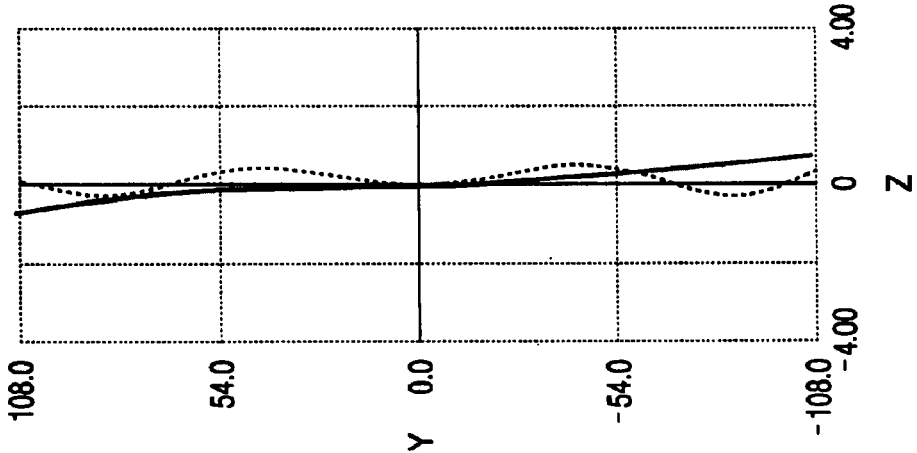
Figure 10C:
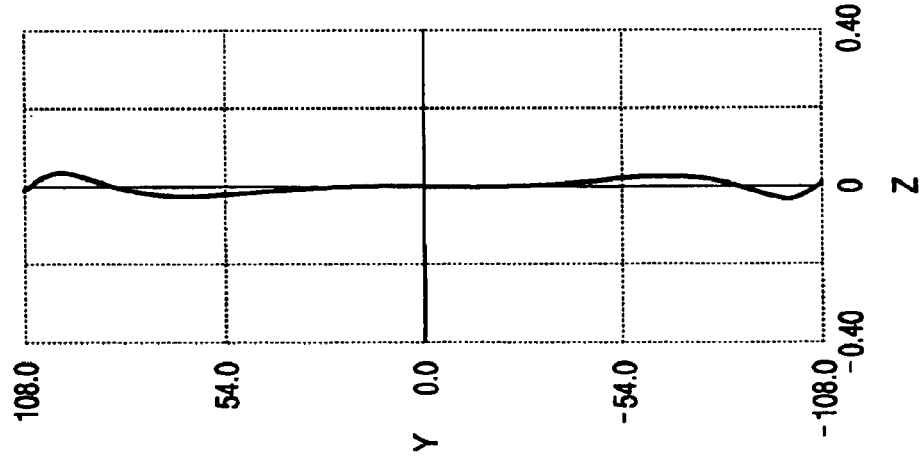
Figure 11C:
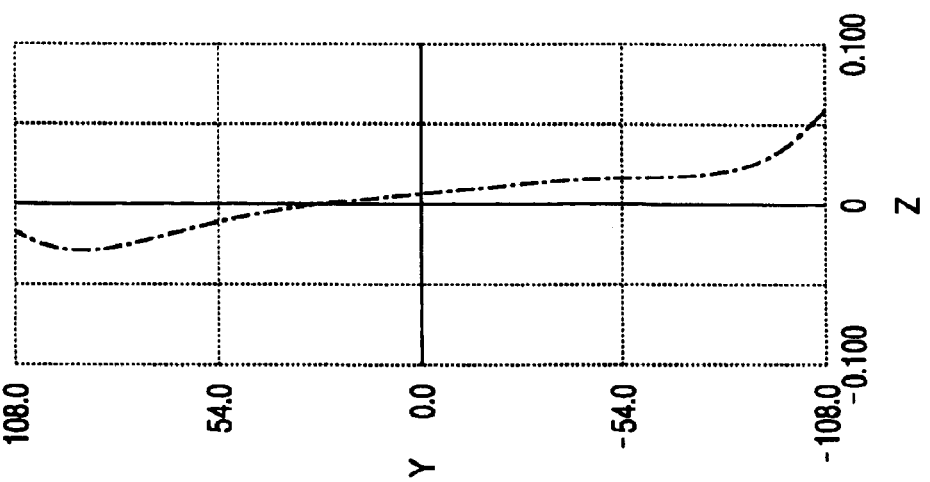
Figure 11B:
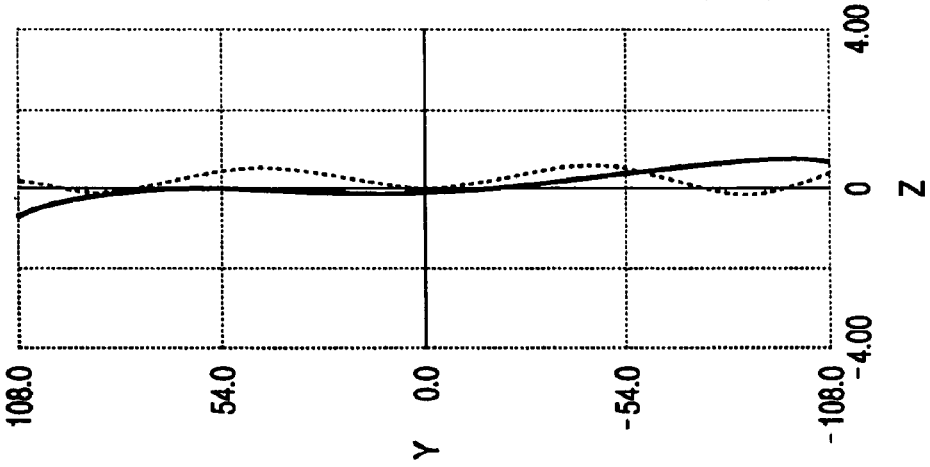
Figure 11A:
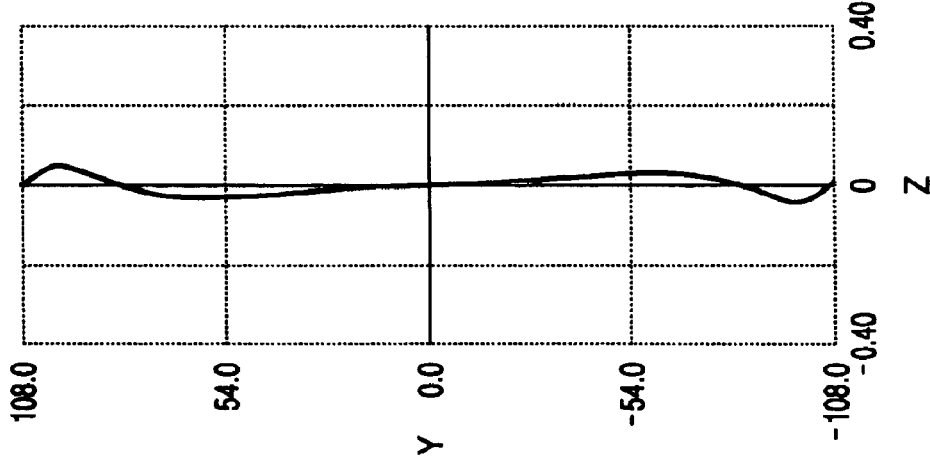
Figure 12C:
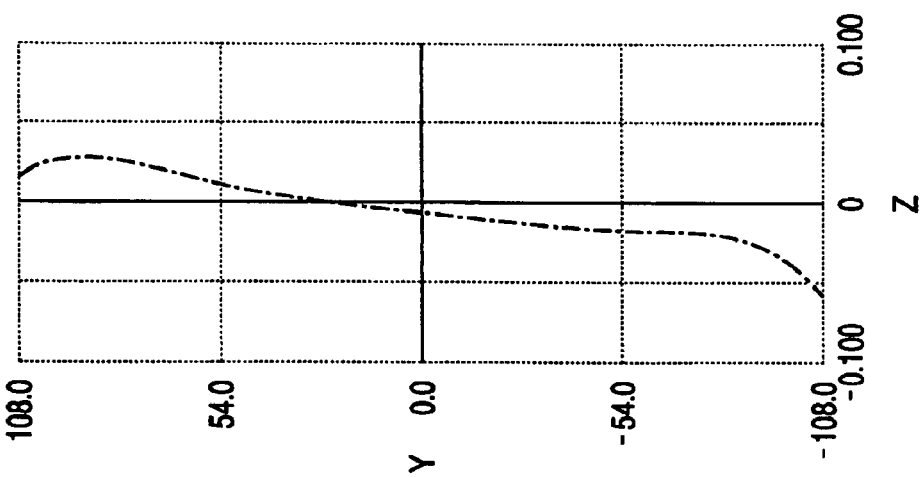
Figure 12B:
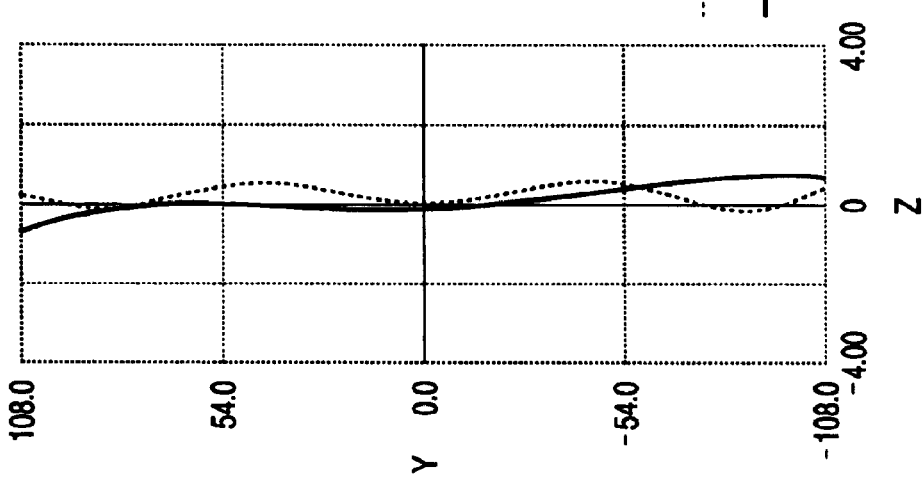
Figure 12A:
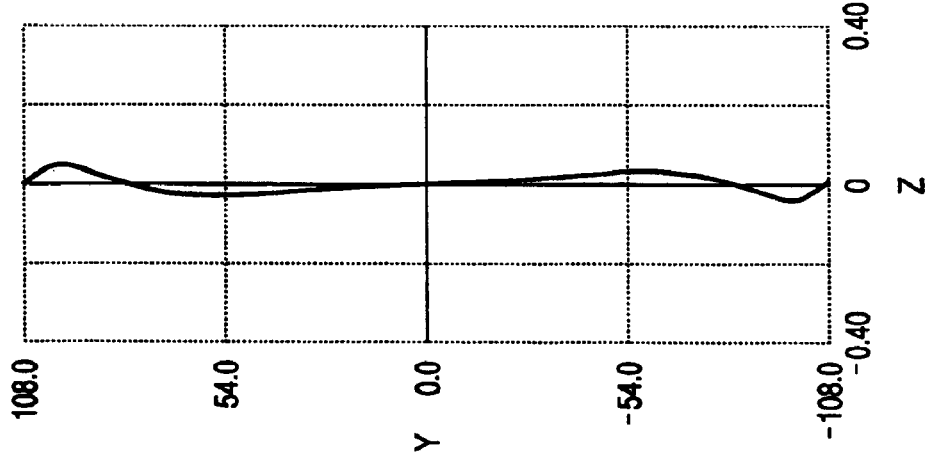
Figure 13:
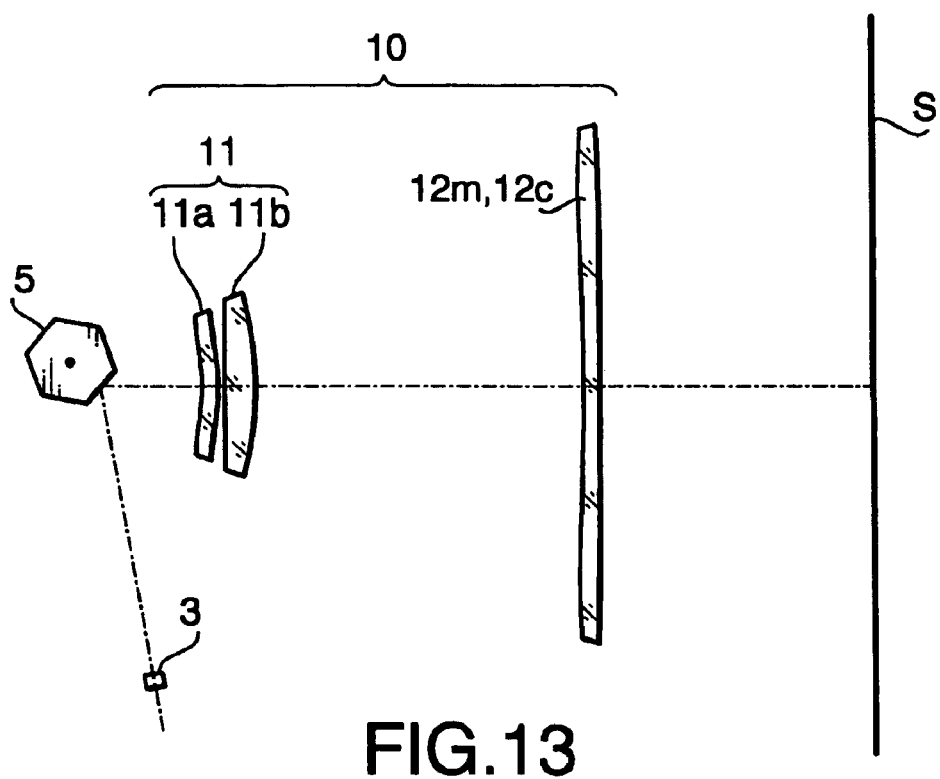
Figure 14:
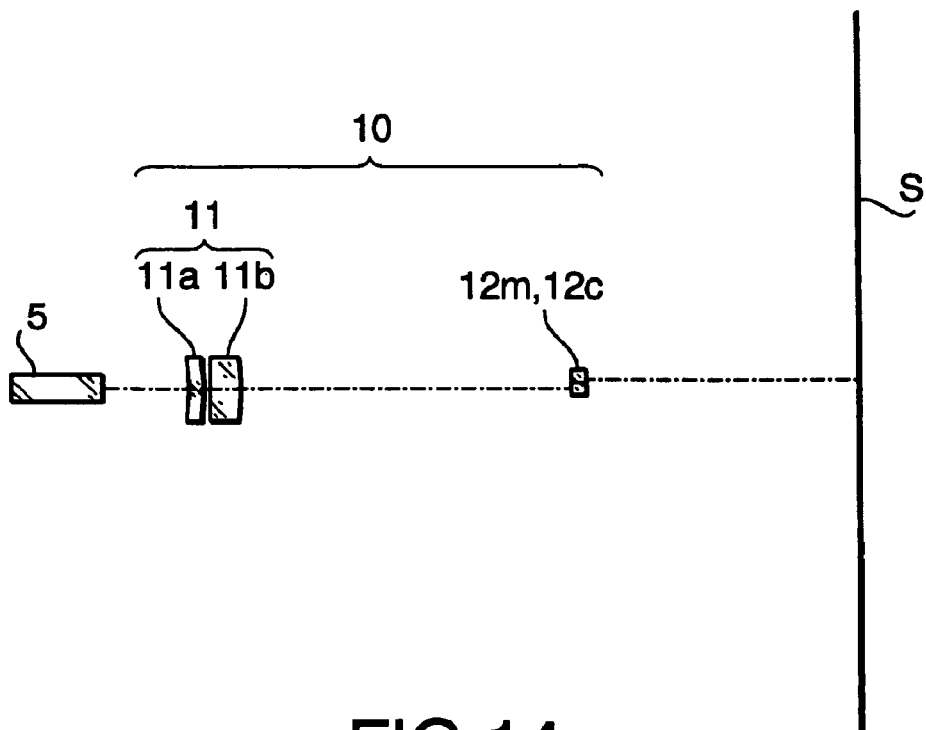
Figure 15:
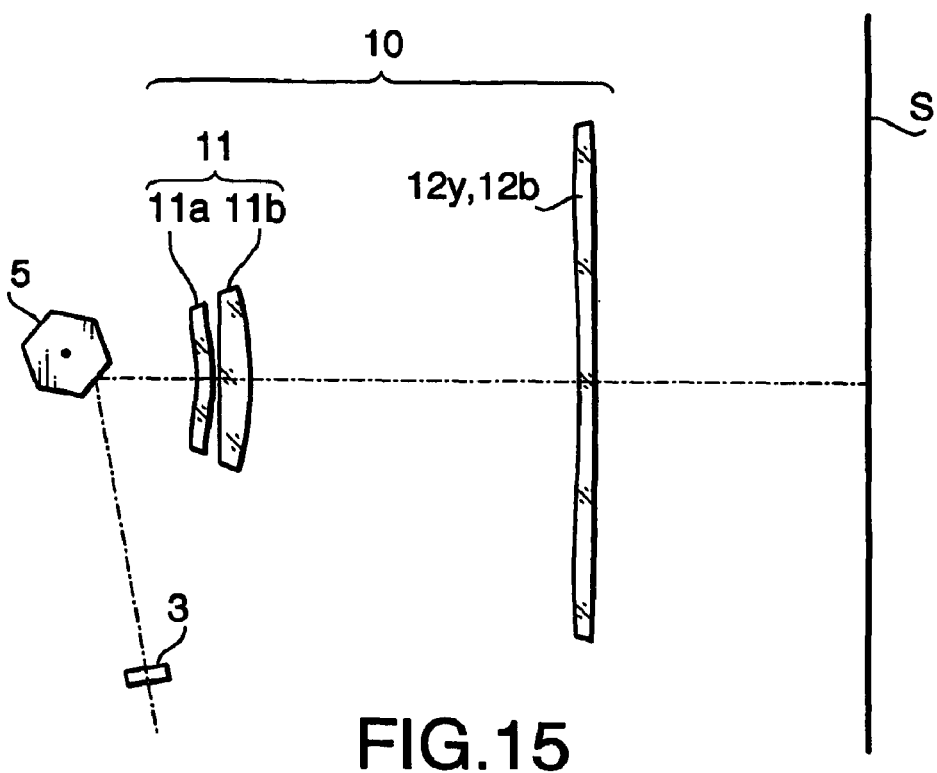
Figure 16:
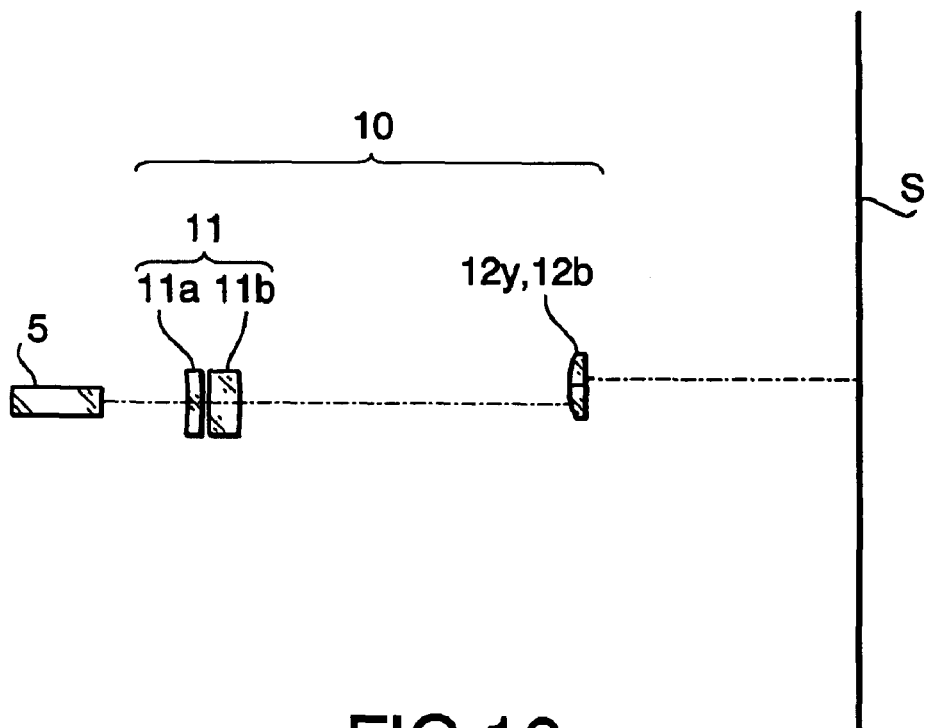
Figure 17C:
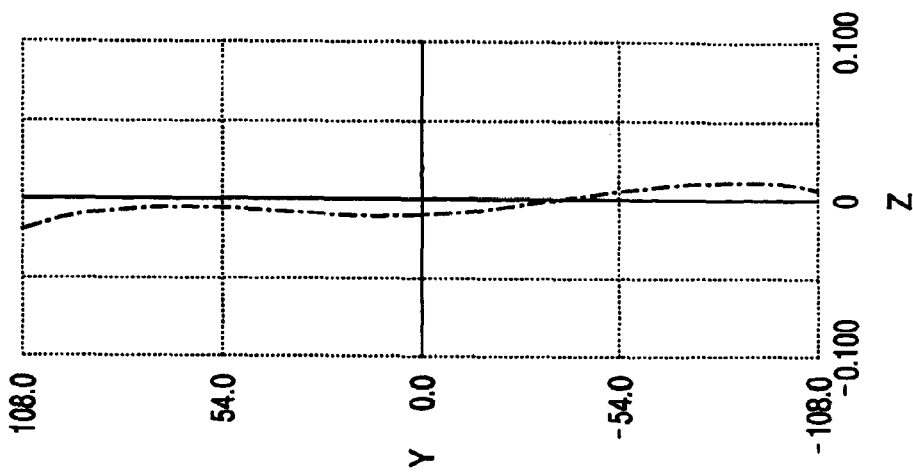
Figure 17B:
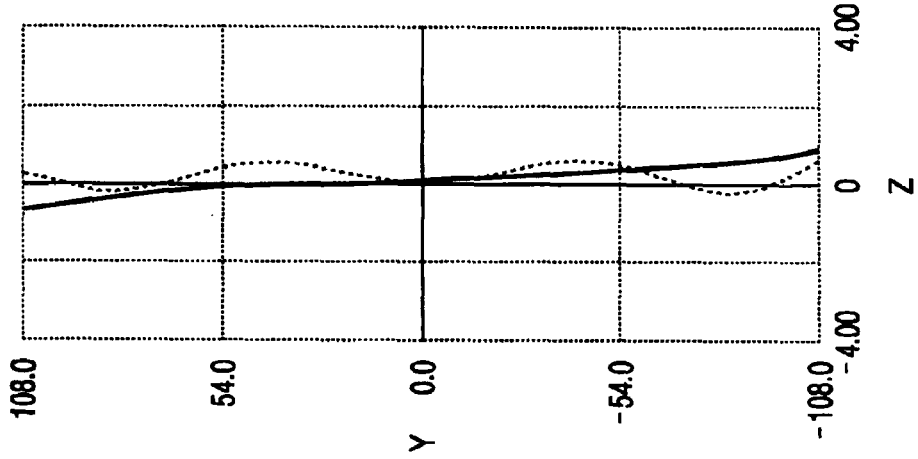
Figure 17A:
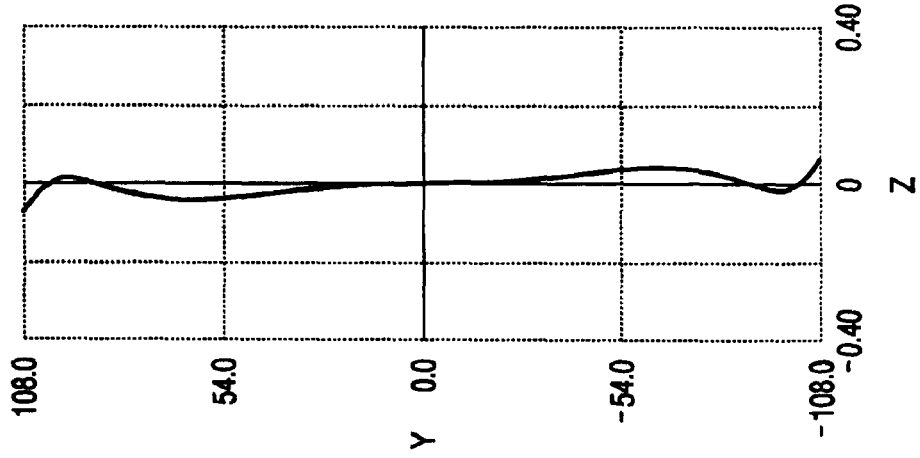
Figure 18C:
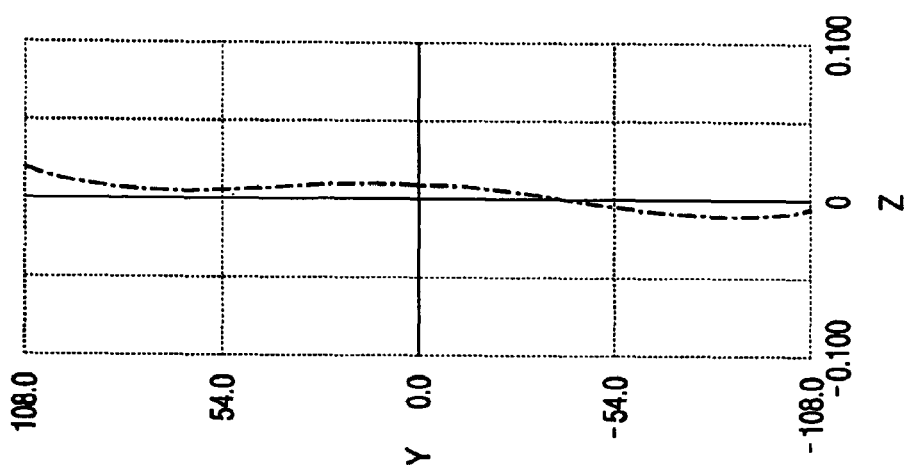
Figure 18B:
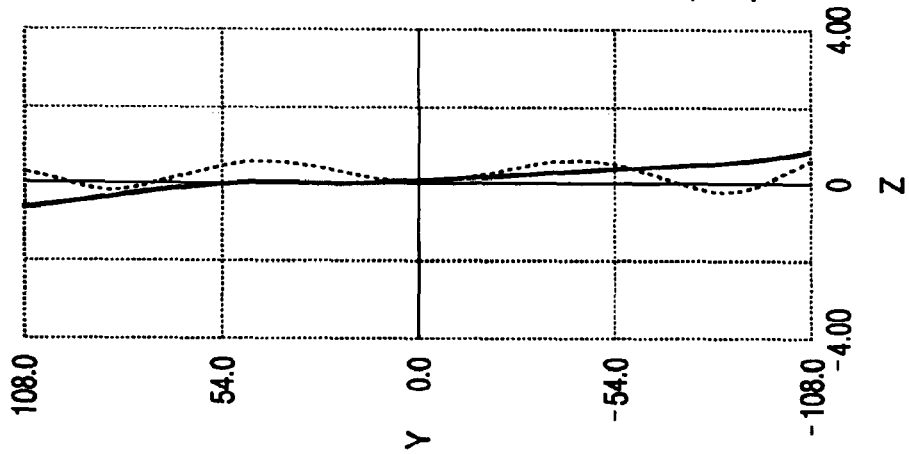
Figure 18A:
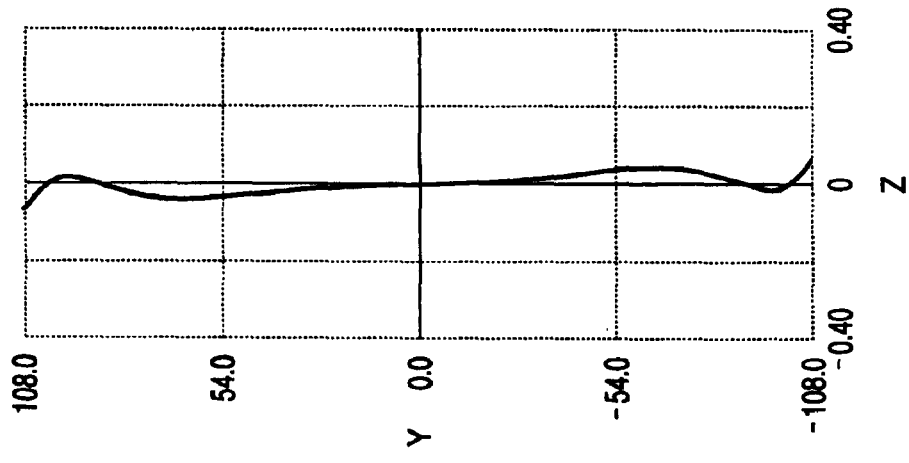
Figure 19C:
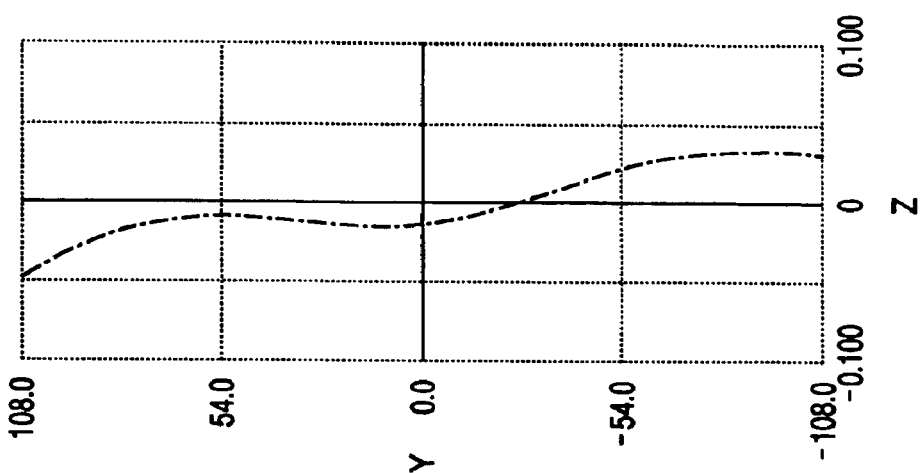
Figure 19B:
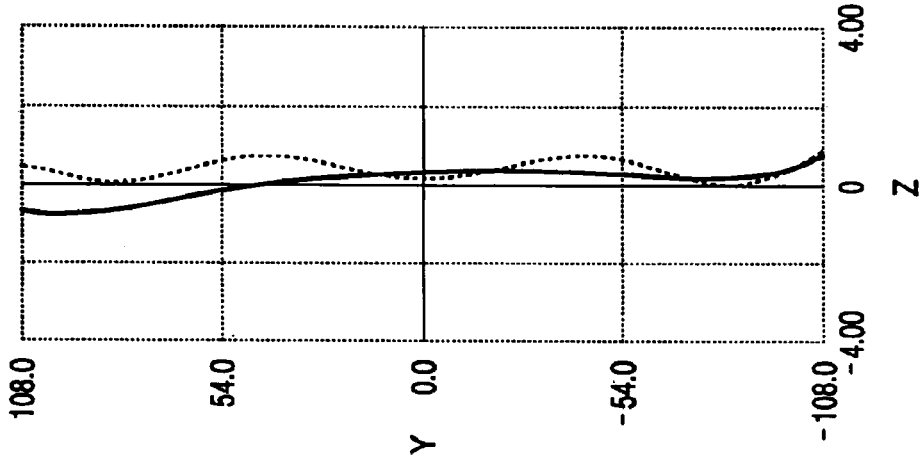
Figure 19A:
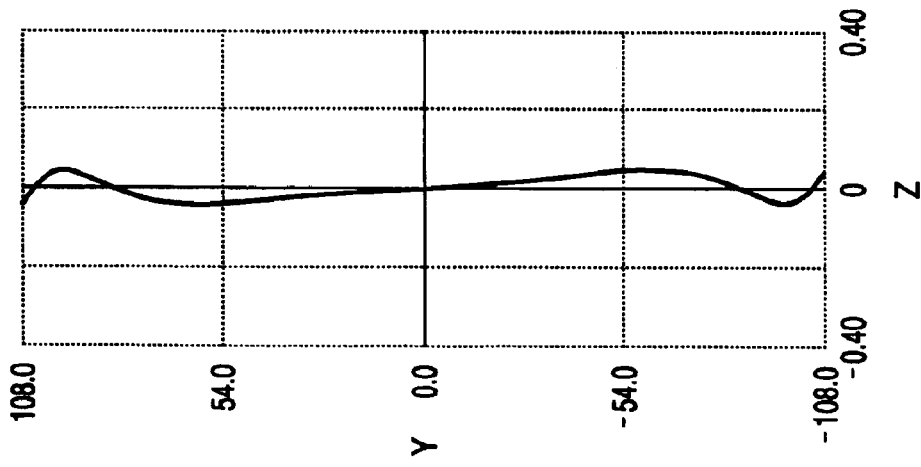

FIG. 3 schematically shows a side view of the scanning optical system;

FIG. 4 shows a developed view of a scanning system along the main scanning direction, showing a portion closer to a main scanning plane, according to a first embodiment;

FIG. 5 shows a developed view of a scanning system along the auxiliary scanning direction, showing a portion closer to the main scanning plane, according to the first embodiment;

FIG. 6 shows a developed view of a scanning system along the main scanning direction, showing a portion farther from the main scanning plane, according to the first embodiment;

FIG. 7 shows a developed view of a scanning system along the auxiliary scanning direction, showing a portion farther from the main scanning plane, according to the first embodiment;

FIG. 8 shows shapes of rear lenses according to the invention;

FIGS. 9A through 9C are graphs showing fθ error, curvatures of fields in the main and auxiliary scanning directions, and bow characteristics of a second rear lens according to the first embodiment;

FIGS. 10A through 10C are graphs showing fθ error, curvatures of fields in the main and auxiliary scanning directions, and bow characteristics of a third rear lens according to the first embodiment;

FIGS. 11A through 11C are graphs showing fθ error, curvatures of fields in the main and auxiliary scanning directions, and bow characteristics of a first rear lens according to the first embodiment;

FIGS. 12A through 12C are graphs showing fθ error, curvatures of fields in the main and auxiliary scanning directions, and bow characteristics of a fourth rear lens according to the first embodiment;

FIG. 13 shows a developed view of a scanning system along the main scanning direction, showing a portion closer to a main scanning plane, according to a second embodiment;

FIG. 14 shows a developed view of a scanning system along the auxiliary scanning direction, showing a portion closer to the main scanning plane, according to the second embodiment;

FIG. 15 shows a developed view of a scanning system along the main scanning direction, showing a portion farther from the main scanning plane, according to the second embodiment;

FIG. 16 shows a developed view of a scanning system along the auxiliary scanning direction, showing a portion farther from the main scanning plane, according to the second embodiment;

FIGS. 17A through 17C are graphs showing fθ error, curvatures of fields in the main and auxiliary scanning directions, and bow characteristics of a second rear lens according to the second embodiment;

FIGS. 18A through 18C are graphs showing fθ error, curvatures of fields in the main and auxiliary scanning directions, and bow characteristics of a third rear lens according to the second embodiment;

FIGS. 19A through 19C are graphs showing fθ error, curvatures of fields in the main and auxiliary scanning directions, and bow characteristics of a first rear lens according to the second embodiment; and FIGS. 20A through 20C are graphs showing fθ error, curvatures of fields in the main and auxiliary scanning directions, and bow characteristics of a fourth rear lens according to the second embodiment.

DESCRIPTION OF THE EMBODIMENTS

Hereinafter, embodiments of the invention will be described with reference to the accompanying drawings.

A scanning optical system according to the present invention is configured to deflect a plurality of laser beams simultaneously, thereby a plurality of scanning lines are formed simultaneously on the same number of surfaces to be scanned, respectively. In particular, the scanning optical system is applicable to a color laser beam printer, in which yellow, magenta, cyan and black toner images are sequentially transferred on a sheet of paper while it is being fed so that a color image is printed quickly.

Figure 1:
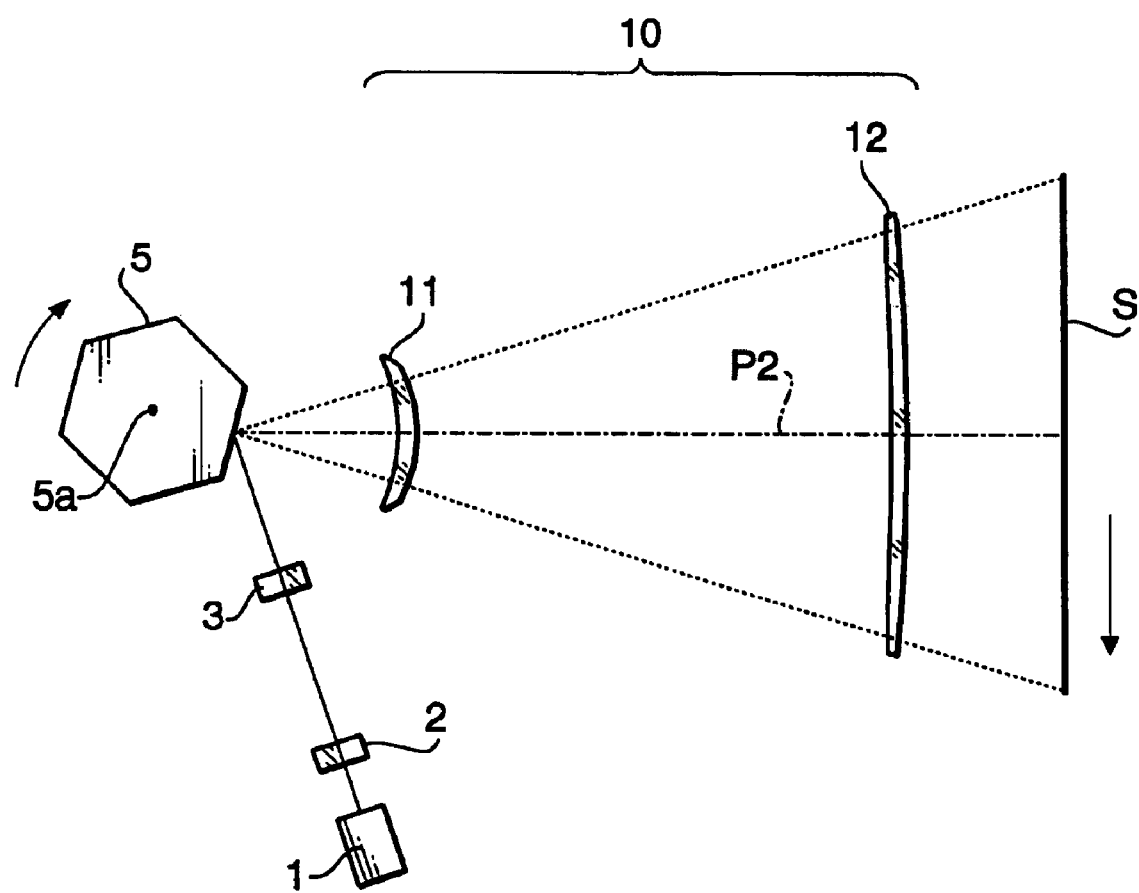
FIG. 1 is a developed view of an optical structure of a scanning optical device along a main scanning direction to which embodiments of the invention are applicable.
Figure 2:
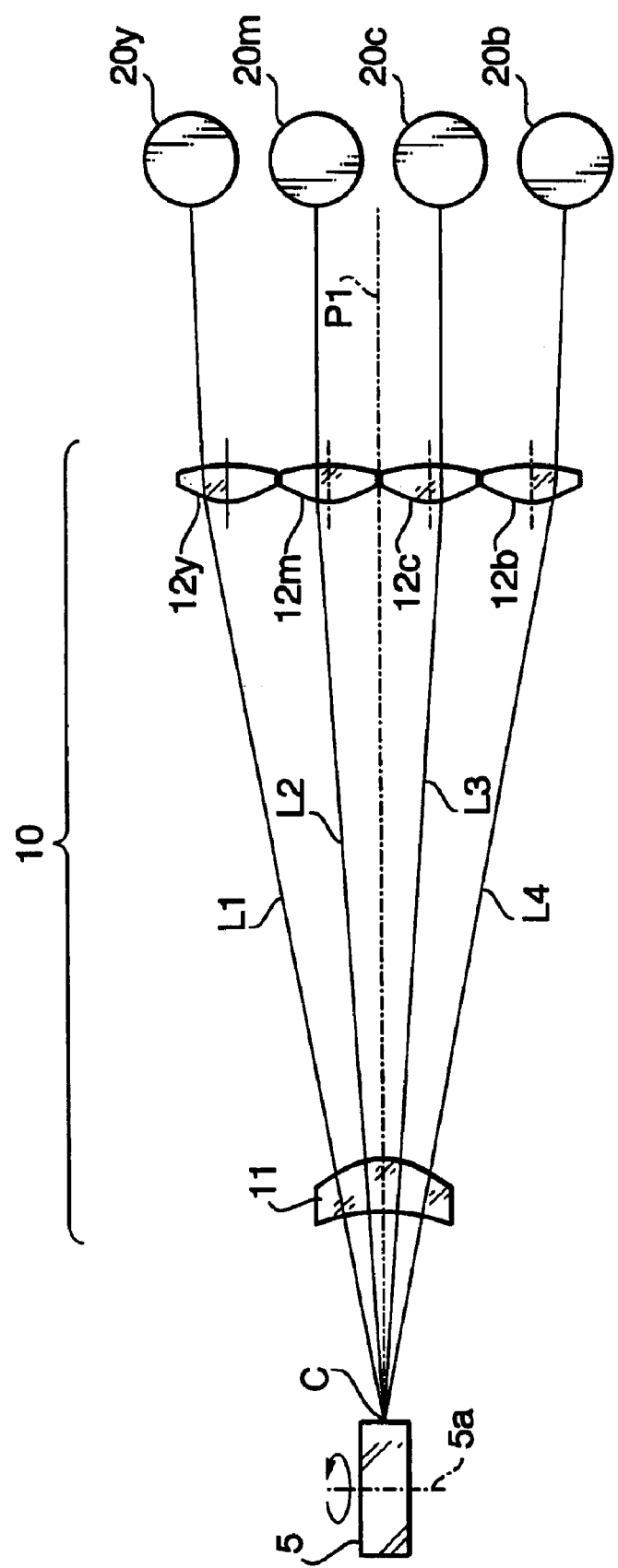
FIG. 2 is a developed view of the optical structure of the scanning optical system along an auxiliary scanning direction.

It should be noted that, according to the embodiments, in order to downsize the color printer, optical paths of the four beams are bent using mirrors, respectively as shown in FIG. 3. In FIGS. 1 and 2, for the sake of simplification of description, the mirrors are omitted and developed optical paths are indicated.

FIG. 1 shows a developed view of the scanning optical system to which the embodiments of the invention are applicable. As shown in FIG. 1, the scanning optical system includes a laser source 1, a collimating lens 2, a cylindrical lens 3, a polygonal mirror 5, and an imaging optical system 10 which converges beams deflected by the polygonal mirror 5. The imaging optical system 10 includes a front lens group 11 and a rear lens group 12.

In this specification, a direction in which a beam spot scans on a surface to be scanned is referred to as a main scanning direction, and a direction perpendicular to the main scanning direction is referred to as an auxiliary scanning direction. The main and auxiliary scanning directions are referred to when an optical element is described with reference to the directions. Further, a plane perpendicular to the rotation axis of the polygonal mirror and including the optical axis of the front lens group will be referred to as a main scanning plane, and a plane including the optical axis of the front lens group and perpendicular to the main scanning plane will be referred to as an auxiliary scanning plane.

The laser beams emitted by the laser source 1 are collimated by the collimating lens 2, and pass through the cylindrical lens 3. The beams are incident on the polygonal mirror 5, which rotates about its rotation axis 5a at a predetermined angular speed, and deflected. Each of the deflected laser beams passes through the imaging optical system 10 and is converged on a surface S to be scanned to form a beam spot, which moves in the main scanning direction at a constant speed.

It should be noted that, in the main scanning direction, a beam collimated by the collimating lens 2 is reflected by the polygonal mirror and travels as a collimated beam. Then, by the converging power of the imaging lens 10, the beam is converged on the surface S to be scanned. In the auxiliary scanning direction (i.e., the direction perpendicular to a surface of FIG. 1), the beam is once converged, by the cylindrical lens 3, on a plane located in the vicinity of the reflection surface of the polygonal mirror, incident on the imaging lens 10 as a diverging beam, and then converged on the surface S by the converging power of the imaging lens 10. Since the reflection surface of the polygonal mirror and the surface S to be scanned have a conjugate relationship, in the auxiliary direction, tilt of the reflection surface of the polygonal mirror 5 (i.e., a so-called facet error) can be compensated for, and thus, a positional error in the auxiliary scanning direction due to the facet error is avoidable. With this configuration, a beam reflected by any one of the reflection surfaces of the polygonal mirror 5 scans on the same scanning line on the surface S to be scanned.

The imaging optical system 10 includes the front lens group 11 which is closer to the polygonal mirror 5, and the rear lens groups 12 which are closer to the surface S to be scanned. The front lens group 11 has a power which converges the beam passed therethrough mainly in the main scanning direction. The rear lens group 12 has a power which converges the beam passed therethrough mainly in the auxiliary scanning direction, and further functions to compensate for curvature of field in the main scanning direction, aberrations and fθ errors.

The scanning optical system according to the invention is configured such that the optical structure shown in FIG. 1 is arranged on four levels in the auxiliary scanning direction, respectively corresponding to yellow (Y), magenta (M), cyan (C) and black (B) color components. As shown in FIG. 2, four photoconductive drums 20y, 20m, 20c and 20b for the above four components are provided, and four scanning lines are formed on the scanning surfaces of the four photoconductive drums 20y, 20m, 20c and 20b, simultaneously. It should be noted that, as shown in FIG. 2, in an actual configuration, a single polygonal mirror 5 and a single front lens group 11 are used for all the beams L1–L4, while four rear lens groups 12y, 12m, 12c and 12b are provided for the four color components.

In the main scanning plane, the four beams L1–L4 proceed along lines which form the same angle with respect to the optical axis of the front lens group 11. In the auxiliary scanning plane, the four beams L1–L4 intersect with each other at a point C in the vicinity of the reflection surface of the polygonal mirror 5. The point C is on the optical axis of the front lens group 11.

Specifically, the beams L1 and L2 proceed on one side with respect to the main scanning plane P1, and are directed to the point C at different incident angles in the auxiliary scanning direction. The beams L3 and L4 proceeds on the other side with respect to the main scanning plane P1, and are directed to the point C at different incident angles in the auxiliary scanning direction. The angles the beams L2 and L3 form with respect to the main scanning plane P1 have the same absolute value, and the angles the beams L1 and L4 form with respect to the main scanning plane P1 have the same absolute value. The paths of the four beams L1–L4 are gradually separated from the main scanning plane P1 after the beams are reflected by the reflection surface of the polygonal mirror 5.

Since all the four beams L1–L4 pass through the front lens group 11, it is designed to have a sufficient width in the auxiliary scanning direction as schematically shown in FIG. 2.

The first through fourth rear lens groups 12y, 12m, 12c and 12b are arranged such that the reference axes thereof are parallelly shifted, with respect to the optical axis of the front lens group 11, in the auxiliary scanning direction. The shifting amounts of the lens groups 12y, 12m, 12c and 12b are determined such that the four beams L1–L4 are incident at predetermined positions which are shifted from the reference axes in the auxiliary scanning direction by predetermined amounts, respectively, as shown in FIG. 2. The reference axes of the first through fourth rear lens groups 12y, 12m, 12c and 12b are defined as axes passing through origins when the surfaces of the rear lens groups 12y, 12m, 12c and 12b are expressed by equations, respectively.

The shifting amounts of the lens groups 12y, 12m, 12c and 12b (i.e., distances between the reference axes thereof and points at which the beams L1–L4 are incident) are determined such that the bow in the auxiliary scanning direction caused by the differences of the incident points of the beams L1–L4 with respect to the reference axes cancel the bow caused by the inclination of the beams with respect to the main scanning plane P1. As shown in FIG. 2, the reference axes are located closer than the points on which the beams L1–L4 are incident to the optical axis of the front lens group. The shifting amounts are determined based on the optical characteristics of the lens groups 11 and 12, a distance between the front lens group 11 and the point C, and, if a distance between the front lens group 11 and the rear lens group 12 are fixed, the angles at which the beams L1–L4 are inclined with respect to the main scanning plane P1, respectively.

It should be noted that if the front lens 11 is configured to be symmetrical with respect to the main scanning plane P1, degree of curvatures of scanning lines formed by the beams incident on the front lens group 11 at the same angles with respect to the main scanning plain P1 are the same. Therefore, according to the embodiment shown in FIG. 2, the shifting amounts of the first and fourth rear lens groups 12y and 12b are the same, and the shifting amounts of the second and third rear lens groups 12m and 12c are the same.

Further, since the inclination angles of the beams L1 and L4 with respect to the main scanning plane P1 are greater than those of the beams L2 and L3, the degree of curvatures of the scanning lines of the beams L1 and L4 is greater than that of the beams L2 and L3. Therefore, the shifting amounts of the rear lens groups 12y and 12b are greater than those of the rear lens groups 12m and 12c.

The shape of the first through fourth rear lens groups 12y, 12m, 12c and 12b are individually designed in accordance with the angles of the incident beams with respect to the main scanning plane P1 so that appropriate effect of canceling aberrations can be achieved. In this embodiment, the absolute values of the angles of the beams L1 and L4 incident on the first and fourth rear lens groups 12y and 12b are the same, and the absolute values of the angles of the beams L2 and L3 incident on the second and third rear lens groups 12m and 12c are the same. Therefore, the first and fourth rear lens groups 12y and 12b are configured such that the shapes thereof in the main scanning direction are symmetrical with respect to the auxiliary scanning plane, and that the rear lens groups 12y and 12b are arranged symmetrically with respect to the main scanning plane P1. Similarly, the rear lens groups 12m and 12c are configured such that the shapes thereof in the main scanning direction are symmetrical with respect to the auxiliary scanning plane, and that the rear lens groups 12m and 12c are arranged symmetrically with respect to the main scanning plane P1. The shape of each of the rear lens groups 12y, 12m, 12c and 12b in the auxiliary scanning direction is asymmetrical.

In the foregoing description, the scanning optical system is described such that the optical paths are developed. Practically, the optical paths of the beams L1–L4 are bent using mirrors as shown in FIG. 3. That is, four rear lens groups 12y, 12m, 12c and 12b are arranged at a predetermined interval on a line which is shifted toward the photoconductive drums 20y, 20m, 20c and 20b with respect to the optical axis of the first lens group 11.

In the optical paths of the beams L1–L4, between the front lens group 11 and each of the rear lens groups 12y, 12m, 12c and 12b, a pair of mirrors 6y and 7y, 6m and 7m, 6c and 7c, and 6b and 7b are inserted so that the beams L1–L4 passed through the front lens group 11 are incident on the rear lens groups 12, 12m, 12c and 12b, respectively. The beams L1–L4 passed through the front lens group 11 are reflected by the mirrors 6y, 6m, 6c and 6b, and then, by mirrors 7y, 7m, 7c and 7b and incident on the rear lens groups 12y, 12m, 12c and 12b, respectively. Thus, the beams L1–L4 reflected by the mirrors 7y, 7m, 7c and 7b intersect the optical paths thereof, respectively.

Distances from the light emitting surfaces of the rear lens groups 12y, 12m, 12c and 12b to the corresponding photoconductive drums 20y, 20m, 20c and 20b are substantially the same. The photoconductive drums 20y, 20m, 20c and 20b have the same cylindrical shape, with their rotation axes extended in the main scanning direction. The photoconductive drums 20y, 20m, 20c and 20b are arranged as equally spaced from each other in the direction parallel to the optical axis of the front lens group 11. It should be noted that the locations of the mirrors 6y, 6m, 6c, 6b, 7y, 7m, 7c and 7b, the rear lens groups 12y, 12m, 12c and 12b, and the photoconductive drums 20y, 20m, 20c and 20b are determined such that the optical path lengths are the same.

Hereinafter, two concrete embodiments will be described. It should be noted that the two embodiments described below are configured as follows.

Two rear lens groups, which are configured to appropriately compensate for aberrations for the laser beam L2, are manufactured. Then, one of the thus manufactured lenses is employed as the rear lens group 12m, which compensates for the aberrations corresponding to the laser beam L2. Further, the other of the two lens groups is employed as another rear lens group 12c, which is located at a symmetrical position with respect to the main scanning plane P1, for compensating for the aberrations corresponding to the laser beam L3.

Further, two rear lens groups, which are configured to appropriately compensate for aberrations for the laser beam L1, are manufactured. Then, one of the thus manufactured lenses is employed as the rear lens group 12y, which compensates for the aberrations corresponding to the laser beam L1. Further, the other of the two lens groups is employed as another rear lens group 12b, which is located at a symmetrical position with respect to the main scanning plane P1, for compensating for the aberrations corresponding to the laser beam L4.

First Embodiment

FIGS. 4 through 7 show configuration of the scanning system according to a first embodiment of the present invention. Specifically, FIG. 4 shows a developed view of a scanning system along the main scanning direction, showing a portion closer to a main scanning plane. FIG. 5 shows a developed view of a scanning system along the auxiliary scanning direction, showing a portion closer to the main scanning plane. FIG. 6 shows a developed view of a scanning system along the main scanning direction, showing a portion farther from the main scanning plane. FIG. 7 shows a developed view of a scanning system along the auxiliary scanning direction, showing a portion farther from the main scanning plane.

In particular, FIGS. 4 and 5 show optical axes of the front lens group 11 and the rear lens group 12 for the beam L2 (or L3). In FIG. 5, the optical axis of the front lens group, which is indicated by dotted line on the left-hand side of the rear lens group 12m (12c), and the optical axis of the rear lens group 12m (12c), which is indicated by the dotted line on the right-hand side of the rear lens group 12m (12c) are shifted in the auxiliary scanning direction. The center of the shape of the rear lens group 12m (12c) is indicated by a solid line. FIGS. 6 and 7 also show optical axes of the front lens group 11 and the rear lens group 12 for the beam L1 (or L4). In FIG. 7, the optical axis of the front lens group, which is indicated by dotted line on the left-hand side of the rear lens group 12y (12b), and the optical axis of the rear lens group 12y (12b), which is indicated by the dotted line on the right-hand side of the rear lens group 12y (12b) are shifted in the auxiliary scanning direction. The center of the shape of the rear lens group 12y (12b) is indicated by a solid line. In these figures, the mirrors 6 (6y, 6m, 6c and 6b) and 7 (7y, 7m, 7c and 7b) are omitted and the optical axes are indicated as developed.

It should be noted that the optical axes of the rear lens groups 12m and 12c, which correspond to the beams L2 and L3, are symmetrical with respect to the main scanning plane P1. Therefore, one optical axis is indicated in FIGS. 4 and 5 and the other is omitted. Similarly, the optical axes of the lenses 12y and 12b, which correspond to the beams L1 and L4, are symmetrical with respect to the main scanning plane P1, and therefore, in FIGS. 6 and 7, only one optical axis corresponding to the beam L1 (or L4) is shown and the other is omitted.

The front lens group 11 includes first and second lenses 11a and 11b. The first lens 11a is configured such that both refraction surfaces are rotationally symmetrical aspherical surfaces. The second lens 11b is configured such that the light incident surface is a planar surface, and the light emitting surface is a spherical surface. Each of the rear lens groups 12y, 12m, 12c and 12b consists of a single lens, of which the light incident surface is asymmetrical with respect to the auxiliary scanning direction. Since each of the rear lens groups 12y, 12m, 12c and 12b consists of a single lens element, they will be referred to as first through fourth rear lenses 12y, 12m, 12c and 12b. The rear lenses 12y, 12m, 12c and 12b are shifted in the auxiliary scanning direction with respect to the optical axis of the front lens group 11 in accordance with the inclination of laser beams L1–L4 with respect to the main scanning plain P1.

The second and third rear lenses 12m and 12c are arranged symmetrically with respect to the optical axis of the first lens group 11. The first and fourth rear lenses 12y and 12b are also arranged symmetrically with respect to the optical axis of the first lens group 11. Further, the rear lenses 12y, 12m, 12c and 12b are oriented such that, when viewed from the front lens group 11, the rear lenses 12y and 12m, which are located on one side of the main scanning plane P1, are rotated by 180° in comparison with the rear lenses 12c and 12b, which are located on the other side of the main scanning plane P1.

TABLE 1 shows example of numerical data of the scanning optical system shown in FIGS. 4 and 5 in a paraxial region, and TABLE 2 shows example of numerical data of the scanning optical system shown in FIGS. 6 and 7 in a paraxial region.

In Tables 1 and 2, NO represents a surface number, which is assigned to each surface of the optical elements of the scanning optical system along a direction where beams proceed. For example, surface #1 represents the beam incident surface of the first lens 11a of the front lens group 11. A symbol R represents a paraxial radius (unit: mm) of the lens surface. If a surface is a rotationally asymmetrical surface, R represents a radius of the surface on a reference axis in the main scanning direction. A symbol Rz represents a radius of curvature in the auxiliary scanning direction (which is omitted if a surface is a rotationally symmetrical). A symbol D represents a distance of the surface and a next downstream side surface (unit: mm) on the optical axis of the front lens group 11. A symbol N(780 nm) represents a refractive index at a design wavelength of 780 nm. A symbol DECZ represent a shifting amount of the reference axis of each of the rear lenses 12y, 12m, 12c and 12b in the auxiliary scanning direction with respect to the optical axis of the front lens group 11 (unit: mm). In this example, a focal length of the entire optical system is 200 mm, and an effective scanning width W on the surface S to be scanned is 216 mm.

A symbol $\alpha$ represents angles, with respect to the optical axis of the front lens group 11, of the laser beams L1–L4 incident on the polygonal mirror 5 when projected on a main scanning plane P1. A symbol $\beta 1$ represents angles (absolute value), with respect to the optical axis of the front lens group 11, of the laser beams L2 and L3 incident on the polygonal mirror 5 when projected on an auxiliary scanning plain P2. A symbol $\beta 2$ represents angles (absolute value), with respect to the optical axis of the front lens group 11, of the laser beams L1 and L4 incident on the polygonal mirror 5 when projected on an auxiliary scanning plain P2.

TABLE 1 f = 200.0 mm W = 216 mm $\alpha$ = 80° $\beta 1$ = 1.15°

| NO | R | Rz | D | N | DECZ |
|---|---|---|---|---|---|
| #-2 | inf. | 51.00 | 4.00 | 1.51072 | — |
| #-1 | inf. | — | 97.00 | — | — |
| #0 | — | — | 33.00 | — | — |
| #1 | -72.40 | | 5.0 | 1.48617 | |
| #2 | -66.00 | | 2.0 | — | |
| #3 | inf. | | 10.0 | 1.51072 | |
| #4 | -121.40 | | 108.0 | — | |
| #5 | -756.70 | | 5.0 | 1.48617 | 2.11 |
| #6 | -1045.70 | | 90.00 | — | — |
| #7 | inf. | — | — | — | — |

TABLE 2 f = 200.0 mm W = 216 mm $\alpha$ = 80° $\beta 2$ = 3.43°

| NO | R | Rz | D | N | DECZ |
|---|---|---|---|---|---|
| #-2 | inf. | 51.00 | 4.00 | 1.51072 | — |
| #-1 | inf. | — | 97.00 | — | — |
| #0 | — | — | 33.00 | — | — |
| #1 | -72.40 | | 5.0 | 1.48617 | |
| #2 | -66.00 | | 2.0 | — | |
| #3 | inf. | | 10.0 | 1.51072 | |
| #4 | -121.40 | | 108.0 | — | |
| #5 | -817.40 | | 5.0 | 1.48617 | 6.08 |
| #6 | -1171.00 | | 90.00 | — | — |
| #7 | inf. | — | — | — | — |

In Tables 1 and 2, surfaces #1 and #2 are the surfaces of the first lens 11a, and surfaces #3 and #4 are surfaces of the second lens 11b of the front lens group 11. Surfaces #5 and

6 represent the rear lenses 12*m* and 12*c* in Table 1, and the rear lenses 12*y* and 12*b* in Table 2. Surface #7 represents the surface S to be scanned.

Surfaces #0, #-1 and #-2 represent a polygonal mirror, a light emitting surface of the cylindrical lens 3, and the light incident surface of the cylindrical lens 3, respectively. As described above, since the first lens 11*a* and the second lens 11*b* are commonly used for all the laser beams L1–L4, for the lenses 11*a* and 11*b*, the same values are indicated in both tables.

Surfaces #1 and #2 are rotational symmetrical aspherical surfaces, which are expressed by SAG amount X(h) representing a distance from a point, whose height with respect to the optical axis is h, on the surface to a tangential plane to the surface at the optical axis thereof. The SAG amount X(h) is given by equation (1) below.

$$X(h) = \frac{Ch^2}{1 + \sqrt{1 - (\kappa+1)C^2 h^2}} + A_4 h^4 + A_6 h^6 + A_8 h^8 \quad (1)$$

In the equation (1), C represents a curvature on the optical axis of the aspherical surface (i.e., C=1/r), κ represents a conical coefficient, and $A_4, A_6, A_8$ represent fourth, sixth and eighth aspherical coefficients. The values of the conical coefficient κ and the aspherical coefficients $A_4, A_6, A_8$ are shown in TABLE 3.

expressed by the SAG amount X(Y, Z) as defined by equation (2), Y being the height, in the main scanning direction, of a point on the reference plane, Z being the height in the auxiliary scanning direction, of the point on the reference plain.

$$X(Y, Z) = \frac{(Y^2 + Z^2)}{r\left(1 + \sqrt{1 - \frac{(\kappa+1)(Y^2 + Z^2)}{r^2}}\right)} + \sum\sum B(m, n) Y^m Z^n \quad (2)$$

In the equation (2), r represents a radius of curvature on the reference axis, κ represents a conical coefficient, and B(m,n) represents aspherical coefficients. The values of the aspherical coefficients for the rear lenses 12*m* and 12*c* are shown in TABLE 4, and those for the rear lenses 12*y* and 12*b* are shown in TABLE 5. The conical coefficient κ of the surface #5 is 0.000.

TABLE 4

| | n | | | | |
|---|---|---|---|---|---|
| m | n = 0 | n = 1 | n = 2 | n = 4 | n = 6 |
| m = 0 | — | $6.209 \times 10^{-3}$ | $1.735 \times 10^{-2}$ | $4.307 \times 10^{-6}$ | $1.194 \times 10^{-9}$ |
| m = 2 | 0.000 | $1.218 \times 10^{-7}$ | $-4.888 \times 10^{-7}$ | $-3.094 \times 10^{-10}$ | 0.000 |
| m = 4 | $1.162 \times 10^{-7}$ | $-5.644 \times 10^{-11}$ | $1.158 \times 10^{-11}$ | 0.000 | 0.000 |
| m = 6 | $-9.586 \times 10^{-12}$ | 0.000 | 0.000 | 0.000 | 0.000 |
| m = 8 | $5.348 \times 10^{-16}$ | 0.000 | 0.000 | 0.000 | 0.000 |

TABLE 5

| | n | | | | |
|---|---|---|---|---|---|
| m | n = 0 | n = 1 | n = 2 | n = 4 | n = 6 |
| m = 0 | — | $1.950 \times 10^{-2}$ | $1.713 \times 10^{-2}$ | $4.244 \times 10^{-6}$ | $1.194 \times 10^{-9}$ |
| m = 2 | 0.000 | $3.140 \times 10^{-7}$ | $-5.098 \times 10^{-7}$ | $-3.703 \times 10^{-10}$ | 0.000 |
| m = 4 | $1.128 \times 10^{-7}$ | $-1.600 \times 10^{-10}$ | $1.642 \times 10^{-11}$ | 0.000 | 0.000 |
| m = 6 | $-9.157 \times 10^{-12}$ | 0.000 | 0.000 | 0.000 | 0.000 |
| m = 8 | $5.189 \times 10^{-16}$ | 0.000 | 0.000 | 0.000 | 0.000 |

TABLE 3

| Surface | κ | $A_4$ | $A_6$ | $A_8$ |
|---|---|---|---|---|
| #1 | 0.000 | $6.657 \times 10^{-6}$ | $6.491 \times 10^{-11}$ | 0.000 |
| #2 | 0.000 | $5.582 \times 10^{-6}$ | $6.714 \times 10^{-10}$ | 0.000 |

Surface #5 is expressed by SAG amount X(Y, Z) representing a distance from a point, whose two-dimensional coordinates are Y (main scanning direction) and Z (auxiliary scanning direction), on the surface to a reference plane tangential to the surface. It should be noted that a point where a reference axis, which is perpendicular to the reference plane, intersects with the reference plane is defined as the origin of the two-dimensional coordinates. Specifically, surface #5 is a rotationally asymmetrical aspherical surface It should be noted that, in the main scanning direction, the aspherical coefficients of odd order (m=1, 3, 5, . . . ) are zero, and thus not indicated in Tables 4 and 5. In such a configuration, the shape of the surface #5 in the main scanning direction is symmetrical with respect to the origin. In the auxiliary scanning direction, the coefficients of the odd order except for those including the first order component are zero (i.e., B(m, n)=0 for n=3, 5, . . . ). Since B(m, 1) is not zero for m=0, 2 and 4, the surface #5 is inclined with respect to the auxiliary scanning direction. In Tables 4 and 5, coefficients of odd order terms except for n=1 are omitted.

Each of the rear lenses 12*y*, 12*m*, 12*c* and 12*b* is only a part, which is shifted from the optical axis in the auxiliary scanning direction, of a lens indicated by the data in Tables 4 and 5. Accordingly, practically, each of the rear lenses 12*y*, 12*m*, 12*c* and 12*b* is formed such that, taking a diameter of a laser beam, fluctuation of beam incident position due to a facet error of the polygonal mirror 5 and the like into account, portions of an entire lens on both sides, in the auxiliary scanning direction, of an area necessary for transmitting a beam is trimmed. The side end surfaces formed by trimming the unnecessary portions are parallel with the reference axis of the lens, and spaced therefrom by predetermined distances.

The rear lenses 12y, 12m, 12c and 12b are arranged symmetrically with respect to the main scanning plane P1, as schematically shown in FIG. 8. That is, FIG. 8 show the rear lenses 12y, 12m, 12c and 12b viewed from the beam incident side, with the mirrors 6 and 7 omitted. The rear lenses 12y, 12m, 12c and 12b are arranged in parallel with each other. Solid lines indicated on the lenses represent loci of beam incident positions of the laser beams L1–L4.

As known from FIG. 8, the loci are formed substantially at the center of the lenses 12m, 12y, 12c and 12b, respectively. It should be noted, however, the origin of each surface when defined by the equation (2) is a position indicated by a symbol "x", and the reference axis of each lens is defined as an axis passing the origin and perpendicular to the surface of FIG. 8.

FIGS. 9A through 9C are graphs showing fθ error (i.e., displacement of the beam spot with respect a designed position), curvatures of fields in the main scanning direction (indicated by broken lines M) and auxiliary scanning direction (indicated by solid line S), and bow (displacement of the spot position in the auxiliary scanning direction) characteristics of the second rear lens 12m according to the first embodiment. In each graph, the vertical axis (y axis) represents the image height (i.e., a distance from the center of the scanning width on the photoconductive drum in the main scanning direction), and the horizontal axis (z axis) represents the quantity of the aberration. The unit is mm (millimeter) in each axis.

The rear lens 12m is designed for the laser beams L2 which proceeds along an optical path close to the main scanning plain P1. As shown in FIGS. 9A–9C, when the second rear lens 12m is used for the laser beam L2, aberrations are well compensated for.

FIGS. 10A through 10C are graphs showing fθ error, curvatures of fields in the main scanning direction (indicated by broken lines M) and auxiliary scanning direction (indicated by solid line S), and bow characteristics of the third rear lens 12c, which has the same shape as the second rear lens 12m.

As shown in FIGS. 10A–10C, when the third rear lens 12c is used for the laser beam L3, which proceeds along an optical path extending symmetrically with respect to that of the laser beam L2, aberrations are well compensated for.

FIGS. 11A through 11C are graphs showing fθ error, curvatures of fields in the main scanning direction (indicated by broken lines M) and auxiliary scanning direction (indicated by solid line S), and bow characteristics of the first rear lens 12y.

As shown in FIGS. 11A–11C, when the first rear lens 12y is used for the laser beam L1, aberrations are well compensated for.

FIGS. 12A through 12C are graphs showing fθ error, curvatures of fields in the main scanning direction (indicated by broken lines M) and auxiliary scanning direction (indicated by solid line S), and bow characteristics of the fourth rear lens 12b, which has the same shape as the first rear lens 12y.

As shown in FIGS. 12A–12C, when the fourth rear lens 12y is used for the laser beam L4, which proceeds along an optical path extending symmetrically with respect to that of the laser beam L1, aberrations are well compensated for.

Second Embodiment

FIGS. 13 through 16 show configuration of the scanning system according to a second embodiment of the present invention. Specifically, FIG. 13 shows a developed view of a scanning system along the main scanning direction, showing a portion closer to a main scanning plane. FIG. 14 shows a developed view of a scanning system along the auxiliary scanning direction, showing a portion closer to the main scanning plane. FIG. 15 shows a developed view of a scanning system along the main scanning direction, showing a portion farther from the main scanning plane. FIG. 16 shows a developed view of a scanning system along the auxiliary scanning direction, showing a portion farther from the main scanning plane.

FIGS. 13 and 14 show an optical axes of the front lens group 11 and the rear lens group 12 for the beam L2 (or L3). In particular, in FIG. 14, the optical axis of the front lens group 11, which is indicated by dotted line on the left-hand side of the rear lens group 12m (12c), and the optical axis of the rear lens group 12m (12c), which is indicated by the dotted line on the right-hand side of the rear lens group 12m (12c) are shifted in the auxiliary scanning direction. The center of the shape of the rear lens group 12m (12c) is indicated by a solid line. FIGS. 15 and 16 also show optical axes of the front lens group 11 and the rear lens group 12 for the beam L1 (or L4). In FIG. 16, the optical axis of the front lens group 11, which is indicated by dotted line on the left-hand side of the rear lens group 12y (12b), and the optical axis of the rear lens group 12y (12b), which is indicated by the dotted line on the right-hand side of the rear lens group 12y (12b) are shifted in the auxiliary scanning direction. The center of the shape of the rear lens group 12y (12b) is indicated by a solid line. In these figures, the mirrors 6 (6y, 6m, 6c and 6b) and 7 (7y, 7m, 7c and 7b) are omitted and the optical axes are indicated as developed.

Similarly to the first embodiment, the optical axes of the rear lens groups 12m and 12c, which correspond to the beams L2 and L3 are symmetrical with respect to the main scanning plane P1. Therefore, one optical axis is indicated in FIGS. 13 and 14 and the other is omitted. Similarly, the optical axes of the rear lens groups 12y and 12b, which correspond to the beams L1 and L4, are symmetrical with respect to the main scanning plane P1, and therefore, in FIGS. 15 and 16, only one optical axis corresponding to the beam L1 (or L4) is shown and the other is omitted.

The front lens group 11 includes first and second lenses 11a and 11b. The first lens 11a is configured such that both refraction surfaces are rotationally symmetrical aspherical surfaces. The second lens 11b is configured such that the light incident surface is a planar surface, and the light emitting surface is a spherical surface.

Each of the rear lens groups 12y, 12m, 12c and 12b consists of a single lens, of which the light incident surface is an asymmetrical surface which does not have a rotational axis. Similar to the first embodiment, the rear lens groups 12y, 12m, 12c and 12b will be referred to as first through fourth rear lenses 12y, 12m, 12c and 12b.

Specifically, the aspherical surface of each of the rear lenses 12y, 12m, 12c and 12b is configured to be an anamorphic aspherical surface, which is defined as a surface of which a radius of curvature on a plane parallel to an x-z cross section (a cross section on an x-z plane) and spaced from the optical axis is expressed by a polynomial that is independent from an z-y cross section thereof.

Similarly to the first embodiment, the rear lenses 12y, 12m, 12c and 12b are shifted in the auxiliary scanning direction with respect to the optical axis of the front lens group 11 in accordance with the inclination of laser beams L1–L4 with respect to the main scanning plane P1.

The second and third rear lenses 12m and 12c are arranged symmetrically with respect to the optical axis of the first lens group 11. The first and fourth rear lenses 12y and 12b are also arranged symmetrically with respect to the optical axis of the first lens group 11. Further, the rear lenses 12y, 12m, 12c and 12b are oriented such that, when viewed from the front lens group 11, the rear lenses 12y and 12m, which are located on one side of the main scanning plane P1, are rotated by 180° in comparison with the rear lenses 12c and 12b, which are located on the other side of the main scanning plane P1.

TABLE 6 shows example of numerical data of the scanning optical system shown in FIGS. 13 and 14 in a paraxial region, and TABLE 7 shows example of numerical data of the scanning optical system shown in FIGS. 15 and 16 in a paraxial region. The symbols used in Tables 6 and 7 are similar to those indicated in Tables 1 and 2.

TABLE 6 f = 200.0 mm  W = 216 mm  α = 80°  β1 = 1.15°

| NO | R | Rz | D | N(780 nm) | DECZ |
|---|---|---|---|---|---|
| #−2 | inf. | 51.00 | 4.00 | 1.51072 | — |
| #−1 | inf. | inf. | 97.00 | — | — |
| #0 | — | — | 33.00 | — | — |
| #1 | −73.90 | | 5.00 | 1.48617 | — |
| #2 | −66.40 | | 2.00 | — | — |
| #3 | inf. | | 10.00 | 1.51072 | — |
| #4 | −119.20 | −76.83 | 108.00 | — | — |
| #5 | −668.20 | 29.31 | 5.00 | 1.48617 | 1.49 |
| #6 | −2831.50 | — | 86.10 | — | — |
| #7 | inf. | — | — | — | — |

TABLE 7 f = 200.0 mm  W = 216 mm  α = 80°  β2 = 3.43°

| NO | R | Rz | D | N(780 nm) | DECZ |
|---|---|---|---|---|---|
| #−2 | inf. | 51.00 | 4.00 | 1.51072 | — |
| #−1 | inf. | inf. | 97.00 | — | — |
| #0 | — | — | 33.00 | — | — |
| #1 | −73.90 | | 5.00 | 1.48617 | — |
| #2 | −66.40 | | 2.00 | — | — |
| #3 | inf. | | 10.00 | 1.51072 | — |
| #4 | −119.20 | −76.83 | 108.00 | — | — |
| #5 | −713.00 | 29.79 | 5.00 | 1.48617 | 4.58 |
| #6 | −3942.60 | — | 86.10 | — | — |
| #7 | inf. | — | — | — | — |

In Tables 6 and 7, surfaces #1 and #2 are the surfaces of the first lens 11a, and surfaces #3 and #4 are surfaces of the second lens 11b of the front lens group 11. Surfaces #5 and #6 represent the rear lenses 12m and 12c in Table 6, and the rear lenses 12y and 12b in Table 7. Surface #7 represents the surface S to be scanned.

Surfaces #0, #−1 and #−2 represent a polygonal mirror, a light emitting surface of the cylindrical lens 3, and the light incident surface of the cylindrical lens 3, respectively. As described above, since the first lens 11a and the second lens 11b are commonly used for all the laser beams L1–L4, for the lenses 11a and 11b, the same values are indicated in both tables.

Surfaces #1 and #2 are rotational symmetrical aspherical surfaces, which are expressed by SAG amount X(h) defined by equation (1).

The values of the conical coefficient κ and the aspherical coefficients $A_4$, $A_6$, $A_8$ according to the second embodiment are shown in TABLE 8.

TABLE 8

| Surface | κ | $A_4$ | $A_6$ | $A_8$ |
|---|---|---|---|---|
| #1 | 0.000 | $7.195 \times 10^{-6}$ | $4.333 \times 10^{-11}$ | 0.000 |
| #2 | 0.000 | $6.038 \times 10^{-6}$ | $7.717 \times 10^{-10}$ | 0.000 |

Surface #5 is expressed as follows. A point on a curved line, which is a line on the surface #5 passing the reference axis and extending in the main scanning direction, is expressed by SAG amount X(Y) representing a distance between the point, whose distance with respect to the reference axis is Y, and a tangential line to the surface #5 at the reference axis. The SAG amount X(Y) is defined by equation (3) below. Further, a radius of curvature rz(Y) in the auxiliary scanning direction at the above point on the curved line is defined by equation (4).

$$X(Y) = \frac{CY^2}{1 + \sqrt{1-(\kappa+1)C^2Y^2}} + A_4 Y^4 + A_6 Y^6 + A_8 Y^8 \quad (3)$$

$$\frac{1}{rz} = \frac{1}{rz_0} + B_1 Y^1 + B_2 Y^2 + B_3 Y^3 + B_4 Y^4 + \cdots \quad (4)$$

In the equation (3), κ represents a conical coefficient, and $A_4$, $A_6$ and $A_8$ represent fourth, sixth and eighth aspherical coefficients, respectively.

In the equation (4), $rz_0$ represents a radius of curvature in the auxiliary scanning direction on the optical axis (i.e., rz in Tables 6 and 7), $B_1$, $B_2$, $B_3$ and $B_4$ are coefficients determining radius of curvature in the auxiliary scanning direction.

The values of the aspherical coefficients for the rear lenses 12m and 12c are shown in TABLE 9, and those for the rear lenses 12y and 12b are shown in TABLE 10. The conical coefficient κ of the surface #5 is 0.000.

TABLE 9

| A4 | $1.341 \times 10^{-7}$ | B1 | 0.000 |
|---|---|---|---|
| A6 | $-1.132 \times 10^{-11}$ | B2 | $-9.890 \times 10^{-7}$ |
| A8 | $6.698 \times 10^{-16}$ | B3 | 0.000 |
| | | B4 | $2.116 \times 10^{-11}$ |

TABLE 10

| A4 | $1.319 \times 10^{-7}$ | B1 | 0.000 |
|---|---|---|---|
| A6 | $-1.123 \times 10^{-11}$ | B2 | $-8.899 \times 10^{-7}$ |
| A8 | $6.758 \times 10^{-16}$ | B3 | 0.000 |
| | | B4 | $7.371 \times 10^{-12}$ |

Each of the rear lenses 12y, 12m, 12c and 12b are formed to be a part of a lens, similarly to those according to the first embodiment, having an elongated shape with a predetermined width in the auxiliary scanning direction, and symmetrically arranged as shown in FIG. 8.

FIGS. 17A through 17C are graphs showing fθ error, curvatures of fields in the main scanning direction (indicated by broken lines M) and auxiliary scanning direction (indicated by solid line S), and bow characteristics of the second rear lens 12m according to the second embodiment. In each graph, the vertical axis (y axis) represents the image height (i.e., a distance from the center of the scanning width on the photoconductive drum in the main scanning direction), and the horizontal axis (z axis) represents the quantity of the aberration. The unit is mm (millimeter) in each axis.

The rear lens 12m is designed for the laser beams L2 which proceeds along an optical path close to the main scanning plain P1. As shown in FIGS. 17A–17C, when the second rear lens 12m is used for the laser beam L2, aberrations are well compensated for.

FIGS. 18A through 18C are graphs showing fθ error, curvatures of fields in the main scanning direction (indicated by broken lines M) and auxiliary scanning direction (indicated by solid line S), and bow characteristics of the third rear lens 12c, which has the same shape as the second rear lens 12m.

As shown in FIGS. 18A–18C, when the third rear lens 12c is used for the laser beam L3, which proceeds along an optical path extending symmetrically with respect to that of the laser beam L2, aberrations are well compensated for.

FIGS. 19A through 19C are graphs showing fθ error, curvatures of fields in the main scanning direction (indicated by broken lines M) and auxiliary scanning direction (indicated by solid line S), and bow characteristics of the first rear lens 12y.

As shown in FIGS. 19A–19C, when the first rear lens 12y is used for the laser beam L1, aberrations are well compensated for.

FIGS. 20A through 20C are graphs showing fθ error, curvatures of fields in the main scanning direction (indicated by broken lines M) and auxiliary scanning direction (indicated by solid line S), and bow characteristics of the fourth rear lens 12b, which has the same shape as the first rear lens 12y.

As shown in FIGS. 20A–20C, when the fourth rear lens 12b is used for the laser beam L4, which proceeds along an optical path extending symmetrically with respect to that of the laser beam L1, aberrations are well compensated for.

As described above, according to the embodiments, the lenses of the front lens group 11 are configured to have surfaces each of which is symmetrical with respect to the main scanning plane P1, and the optical paths of the laser beams L1 and L4 as well as the optical paths of the laser beams L2 and L3 are symmetrically arranged with respect to the main scanning plane P1.

Because of the above configuration, by preparing the lenses 12m and 12c which are the same lenses, and preparing the lenses 12y and 12b which are also the same lenses, and arranging the lenses 12m and 12c symmetrically with respect to the main scanning plane P1 , and arranging the lenses 12y and 12b also symmetrically with respect to the main scanning plane P1, aberrations can be appropriately compensated for. It should be noted that, when viewed from the front lens group 11, the rear lenses 12y and 12m, which are located on one side of the main scanning plane P1, are rotated by 180° in comparison with the rear lenses 12c and 12b, which are located on the other side of the main scanning plane P1 . Then, the laser beams L2 and L3 are directed to the equivalent portions of the rear lenses 12m and 12c, respectively, and the laser beams L1 and L4 are directed to the equivalent portions of the rear lenses 12y and 1b, thereby aberrations are well compensated. According to such a configuration, the effective area of the rear lenses 12y, 12m, 12c and 12b in the auxiliary scanning direction need not be widened, which decreases the manufacturing costs thereof. In particular, if the rear lenses are manufactured using molding, the manufacturing cost may be further decreased.

In the above-described embodiments, four beams are used and accordingly there are four rear lens groups employed. The invention is not limited to such a configuration, and a person skilled in the art can easily change the number of the beams, therefore the number of rear lens groups without departing from the teachings of the present invention. That is, the number of beam can be two, or any even number greater than four.

The present disclosure relates to the subject matter contained in Japanese Patent Application No. 2001-186888, filed on Jun. 20, 2001, which is expressly incorporated herein by reference in its entirety.

What is claimed is:

1. A scanning optical system that emits at least two beams to a plurality of surfaces to be scanned, comprising:

a polygonal mirror that is rotated about a rotation axis thereof to deflect the at least two beams simultaneously to scan in a main scanning direction, the at least two beams incident on said polygonal mirror along a plurality of optical paths arranged symmetrically with respect to a plane perpendicular to said rotation axis; and an imaging optical system that converges the at least two beams deflected by said polygonal mirror on the plurality of surfaces to be scanned, said imaging optical system including at least two lenses, each of said at least two lenses converging an incident beam, in an auxiliary scanning direction which is perpendicular to the main scanning direction, on a corresponding surface to be scanned, the at least two beams deflected by said polygonal mirror passing through said at least two lenses, said at least two lenses having the same shapes and being arranged symmetrically with respect to the plane, an orientation of one of said at least two lenses being oriented oppositely by 180° rotation, in the auxiliary scanning direction, to the other one of said at least two lenses.

2. The scanning optical system according to claim 1, wherein there are the same number of said at least two lenses as there are of the plurality of surfaces to be scanned.

3. The scanning optical system according to claim 1, wherein each of said at least two lenses is configured to be symmetrical with respect to a plane which includes a reference axis of each of said at least two lenses and parallel with the rotational axis of said polygonal mirror.

4. The scanning optical system according to claim 3, wherein each of said at least two lenses has an anamorphic aspherical surface expressed by two-dimensional polynomial, inclination of said anamorphic aspherical surface varying in the auxiliary scanning direction.

5. A scanning optical system that emits at least two beams to a plurality of surfaces to be scanned, comprising:

a polygonal mirror that is rotated about a rotation axis thereof to deflect the at least two beams simultaneously to scan in a main scanning direction, the at least two beams incident on said polygonal mirror along a plurality of optical paths arranged symmetrically with respect to a plane perpendicular to said rotation axis; and an imaging optical system that converges the at least two beams deflected by said polygonal mirror on the plurality of surfaces to be scanned, said imaging optical system including a plurality of lenses, each of said plurality of lenses converging an incident beam, in an auxiliary scanning direction which is perpendicular to the main scanning direction, on a corresponding surface to be scanned, the at least two beams deflected by said polygonal mirror passing through said plurality of lenses, said plurality of lenses having the same shapes and being arranged symmetrically with respect to the plane, an orientation of lenses of said plurality of lenses receiving beams proceeding along optical paths arranged on one side of said plane being oriented oppositely by 180° rotation, in the auxiliary scanning direction, to the other lenses receiving beams proceeding along optical paths arranged on the other side of said plane.

6. The scanning optical system according to claim 5, wherein there are the same number of said plurality of lenses as there are of the plurality of surfaces to be scanned.

7. The scanning optical system according to claim 5, wherein each of said plurality of lenses is configured to be symmetrical with respect to a plane which includes a reference axis of each of said plurality of lenses and parallel with the rotational axis of said polygonal mirror.

8. The scanning optical system according to claim 7, wherein each of said plurality of lenses has an anamorphic aspherical surface expressed by two-dimensional polynomial, inclination of said anamorphic aspherical surface varying in the auxiliary scanning direction.

9. A scanning optical system that emits an even number of beams to a plurality of surfaces to be scanned, comprising:

a polygonal mirror that is rotated about a rotation axis thereof to deflect the even number of beams simultaneously to scan in a main scanning direction, the even number of beams incident on said polygonal mirror along a plurality of optical paths arranged symmetrically with respect to a plane perpendicular to said rotation axis; and an imaging optical system that converges the even number of beams deflected by said polygonal mirror on the plurality of surfaces to be scanned, said imaging optical system including an even number of lenses, each of said even number of lenses converging an incident beam, in an auxiliary scanning direction which is perpendicular to the main scanning direction, on a corresponding surface to be scanned, the even number of beams deflected by said polygonal mirror passing through said even number of lenses, said even number of lenses having the same shapes and being arranged symmetrically with respect to the plane, an orientation of lenses of said even number of lenses receiving beams proceeding along optical paths arranged on one side of said plane being oriented oppositely by 180° rotation, in the auxiliary scanning direction, to the other lenses receiving beams proceeding along optical paths arranged on the other side of said plane.

10. The scanning optical system according to claim 9, wherein there are the same number of said even number of lenses as there are of the plurality of surfaces to be scanned.

11. The scanning optical system according to claim 9, wherein each of said even number of lenses is configured to be symmetrical with respect to a plane which includes a reference axis of each of said even number of lenses and parallel with the rotational axis of said polygonal mirror.

12. The scanning optical system according to claim 11, wherein each of said even number of lenses has an anamorphic aspherical surface expressed by two-dimensional polynomial, inclination of said anamorphic aspherical surface varying in the auxiliary scanning direction.

13. A scanning optical system that emits an even number of beams to a plurality of surfaces to be scanned, comprising:

a polygonal mirror that is rotated about a rotation axis thereof to deflect the even number of beams simultaneously to scan in a main scanning direction, the even number of beams incident on said polygonal mirror along a plurality of optical paths arranged symmetrically with respect to a plane perpendicular to said rotation axis; and an imaging optical system that converges the even number of beams deflected by said polygonal mirror on the plurality of surfaces to be scanned, said imaging optical system including a plurality of lenses, each of said plurality of lenses converging an incident beam, in an auxiliary scanning direction which is perpendicular to the main scanning direction, on a corresponding surface to be scanned, the even number of beams deflected by said polygonal mirror passing through said plurality of lenses, said plurality of lenses having the same shapes and being arranged symmetrically with respect to the plane, an orientation of lenses of said plurality of lenses receiving beams proceeding along optical paths arranged on one side of said plane being oriented oppositely by 180° rotation, in the auxiliary scanning direction, to the other lenses receiving beams proceeding along optical paths arranged on the other side of said plane.

14. The scanning optical system according to claim 13, wherein there are the same number of said plurality of lenses as there are of the plurality of surfaces to be scanned.

15. The scanning optical system according to claim 13, wherein each of said plurality of lenses is configured to be symmetrical with respect to a plane which includes a reference axis of each of said plurality of lenses and parallel with the rotational axis of said polygonal mirror.

16. The scanning optical system according to claim 15, wherein each of said plurality of lenses has an anamorphic aspherical surface expressed by two-dimensional polynomial, inclination of said anamorphic aspherical surface varying in the auxiliary scanning direction.

* * * * *